United States Patent [19]
Adachi et al.

[11] Patent Number: 5,892,592
[45] Date of Patent: Apr. 6, 1999

[54] IMAGE PROCESSING APPARATUS

[75] Inventors: Yasushi Adachi; Yoshiyuki Nakai, both of Nara, Japan

[73] Assignee: Sharp Kabushiki Kaisha, Osaka, Japan

[21] Appl. No.: 540,580

[22] Filed: Oct. 6, 1995

[30] Foreign Application Priority Data

Oct. 27, 1994 [JP] Japan .................................... 6-264232

[51] Int. Cl.$^6$ .............................. G06K 9/36; H04N 1/40; H04N 1/387
[52] U.S. Cl. .......................... 358/462; 350/448; 350/452; 350/453; 382/156; 382/159; 382/170; 382/282; 382/290; 382/292
[58] Field of Search ................................ 358/474, 261.3, 358/448, 443, 452, 453, 454, 455, 456, 462, 486, 487, 494; 382/156, 157, 159, 165, 170, 171, 173, 175, 177, 180, 192, 194, 201, 210

[56] References Cited

U.S. PATENT DOCUMENTS

| 4,194,221 | 3/1980 | Stoffel | 358/283 |
|---|---|---|---|
| 4,547,811 | 10/1985 | Ochi et al. | 358/283 |
| 4,722,008 | 1/1988 | Ibaraki | 358/283 |
| 4,953,013 | 8/1990 | Tsuji et al. | 358/462 |
| 4,953,114 | 8/1990 | Sato | 358/456 |
| 5,016,118 | 5/1991 | Nannichi | 358/462 |
| 5,075,788 | 12/1991 | Funada | 358/458 |
| 5,280,546 | 1/1994 | Machida et al. | 358/455 |
| 5,287,419 | 2/1994 | Sato et al. | 358/455 |
| 5,289,293 | 2/1994 | Kato et al. | 358/462 |
| 5,327,262 | 7/1994 | Williams | 358/462 |
| 5,339,172 | 8/1994 | Robinson | 358/462 |
| 5,339,365 | 8/1994 | Kawai et al. | 358/448 |
| 5,361,142 | 11/1994 | Semasa | 358/455 |
| 5,381,241 | 1/1995 | Kawanaka et al. | 358/462 |
| 5,422,981 | 6/1995 | Niki | 382/159 |
| 5,436,981 | 7/1995 | Ishikawa | 358/462 |
| 5,481,621 | 1/1996 | Kuratomi et al. | 382/204 |
| 5,555,029 | 9/1996 | Kim | 348/607 |
| 5,608,819 | 3/1997 | Ikeuchi | 358/462 |

FOREIGN PATENT DOCUMENTS

| 0187724 A | 7/1986 | European Pat. Off. . |
|---|---|---|
| 61-194968 | 8/1986 | Japan . |
| 62-147860 | 7/1987 | Japan . |
| 63-114462 A | 5/1988 | Japan . |
| 63-246076 | 10/1988 | Japan . |
| 2-215276 | 8/1990 | Japan . |
| 5-21384 | 3/1993 | Japan . |
| 7-037087 A | 2/1995 | Japan . |

*Primary Examiner*—Edward L. Coles
*Assistant Examiner*—Mark Wallerson
*Attorney, Agent, or Firm*—David G. Conlin; David D. Lowry

[57] ABSTRACT

An image processing apparatus inputs an image signal obtained by scanning a document in which a character region, a photographic region and a dot region are mixed and stores image data in a local block composed of a target picture element and plural picture elements surrounding the target picture element. The image processing apparatus computes first and second feature parameters $P_0$ and $P_1$ representing the features of each region based on the image data in the local block, and inputs the resulting first and second feature parameters $P_0$ and $P_1$ to an identification circuit adopting a neural network. The identification circuit outputs the region identification information $O_0$ and $O_1$ of the target picture element, and the filter processing circuit performs a spatial filtering process according to the region identification information $O_0$ and $O_1$. As described, in the image processing apparatus, since a multi-dimensional identification process is performed using the neural circuit which receives inputs of plural feature parameters, an image identification with very high precision is permitted, and an optimum spatial-filtering process can be applied according to the feature of each picture element,

43 Claims, 18 Drawing Sheets

FIG. 2

| 0 | -1 | 0 |
|---|---|---|
| -1 | 5 | -1 |
| 0 | -1 | 0 |

FIG. 3

| $1/16$ | $1/16$ | $1/16$ |
|---|---|---|
| $1/16$ | $8/16$ | $1/16$ |
| $1/16$ | $1/16$ | $1/16$ |

INPUT LAYER    INTERMEDIATE LAYER    OUTPUT LAYER

FIG.11(a)
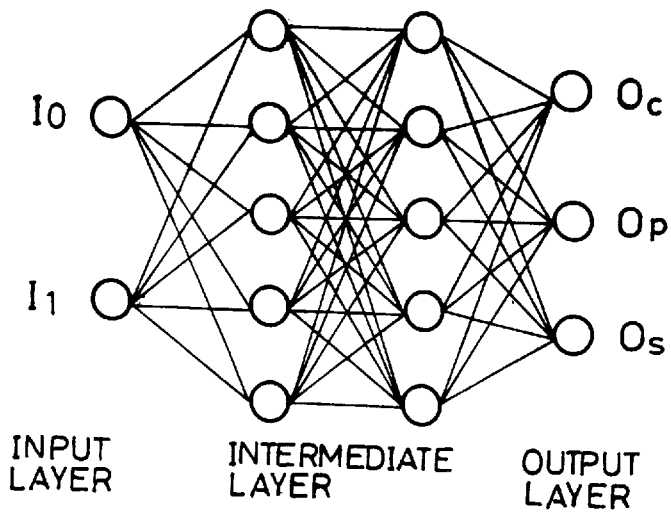
FIG.11(b)
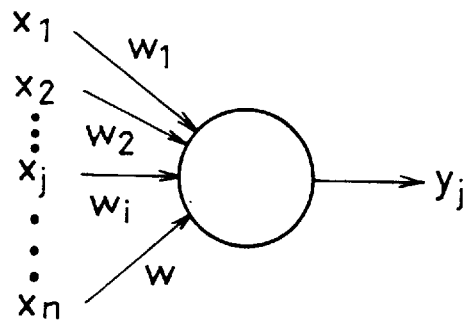
FIG. 12
| -6/40 | -3/40 | -5/40 | -3/40 | -6/40 |
|---|---|---|---|---|
| -3/40 | 7/40 | 10/40 | 7/40 | -3/40 |
| -5/40 | 10/40 | 36/40 | 10/40 | -5/40 |
| -3/40 | 7/40 | 10/40 | 7/40 | -3/40 |
| -6/40 | -3/40 | -5/40 | -3/40 | -6/40 |

IMAGE PROCESSING APPARATUS

FIELD OF THE INVENTION

The present invention relates to an image processing apparatus provided in a digital copying machine, a facsimile machine, etc., which attains an improved quality of a recording image by applying an optimum process to an image signal obtained by scanning a document according to features of each picture element.

BACKGROUND OF THE INVENTION

Conventionally, in digital copying machines, facsimile machines, etc., an image signal obtained by reading a document composed of a character region, a photographic region or a dot region, or a document composed of a mixture of these regions by means of a CCD image sensor is processed to attain an improved quality of a recorded image. In the described process of the image, first, the type of the read image is identified, i.e., whether the read image is a character image, a photographic image or a dot image. Then, based on the result of this identification, an optimum process is applied to each picture element.

Known image identification methods to attain an improved image quality in the described manner include: A method wherein an image is divided into blocks, each being composed of plural picture elements, and an identification of an image is performed per each block by a pattern matching technique or using feature parameters indicative of features of the character image or the dot image.

However, the image identification method using the pattern matching technique has the following problem. That is, since it is required to prepare many patterns, a huge memory is required. Thus, this method is not suitable for practical applications. For this reason, the image identification method using the feature parameters is used in many cases.

Japanese Laid-Open Patent Publication No. 194968/1986 (Tokukaisho 61-194968) discloses a dot/photographic image identification method as an example of such image identification method using the feature parameters. In the method of this disclosure, a change in signal level in two picture elements which are three-dimensionally in sequence is measured separately between the following two cases: the case where the two picture elements are in sequence in a main-scanning direction and the case where the two picture elements are in sequence in a sub-scanning direction. Then, a sum of the measured values in each block is compared with a predetermined threshold, and an image is recognized based on the result of this comparison.

Japanese Laid-Open Patent Publication No. 147860/1987 (Tokukaisho 62-147860) discloses an intermediate tone facsimile signal processing method as another example of the image identification method using the feature parameters. In this method, first a difference between a maximum signal level and a minimum signal level in the block is computed, and the computed difference is compared with a predetermined threshold. As a result of this comparison, if the computed difference in signal level is smaller than the predetermined threshold, an identification signal for a smooth change in signal level indicating that the block is located in a photographic region is outputted. On the other hand, when the computed level difference is larger than the predetermined threshold, an identification signal for a sudden change in signal level indicating that the block is located in the character region or on the outline portion of the photographic image is outputted. Furthermore, according to a predetermined access order in the block, a number of changes in signal level in two picture elements which are three dimensionally in sequence is compared with a predetermined number. As a result of this comparison, if the number of changes is greater than the predetermined number, an identification signal indicating that the block is located in the dot region is outputted. On the other hand, if the number of changes is smaller than the predetermined number, an identification signal indicating that the block is not in the dot region is outputted. Based on the identification signal, the signal process is applied to each picture element in the block.

For the image process to attain an improved image, conventionally, a spatial-filtering process is adopted. One example of the technique of attaining an improved image quality adopting the filtering process is disclosed in Japanese Examined Patent Publication No. 5-21384 (Tokukohei 5-21384). In the image processing apparatus of this disclosure, a spatial filter for smoothing the image signal and a spatial filter for enhancing the image signal are prepared beforehand, and based on an output from edge detection means for detecting an edge portion of the image signal, a signal obtained by applying a smoothing process to the image signal or a signal obtained by applying an enhancement process to the image signal, or a signal obtained by applying a combined process of the smoothing process and the enhancement process is outputted. Another method is adopted in a filtering apparatus disclosed in Japanese Laid-Open Patent Application No. 246076/1988 (Tokukaisho 63-246076). In this method, a spatial filter for removing a dot region is prepared beforehand, and when the edge portion is not extracted by edge extraction means for extracting the edge portion of the image signal, a signal having gone through the filtering process is outputted. On the other hand, when the edge portion is extracted, a signal is outputted before having gone through the filtering process.

However, in the described image identification method, an error may occur in identifying the image, and to attain a high quality image, a still more precise identification is required. The possible cause of this identification error of the image would be a mismatch of a feature parameter. That is, the error is caused as the feature parameter fails to fully represent the features of each region. The other possible cause of the described identification error is an inappropriate selection of the classification method itself for identifying the image based on the feature parameter, or the threshold value for the classification.

Moreover, in the conventional filtering process by the spatial filter prepared beforehand, an identification process is completely performed for each block based on the resulting feature parameters, and based on the result of identification, a filtering process is applied to a target picture element in block using a predetermined spatial filter. In this method, the image is greatly affected when an identification error occurs, and the feature parameter of a target picture element reflects only a specific filter feature, thereby presenting the problem that a fine processing such as applying an optimal filtering process to each picture element cannot be achieved.

SUMMARY OF THE INVENTION

An object of the present invention is to provide an image processing apparatus which attains a high quality image by applying thereto an appropriate spatial-filtering process according to features of each picture element.

In order to achieve the above object, the image processing apparatus in accordance with the present invention is characterized by including:

(1) a block memory for storing image data in a local block composed of a target picture element and plural picture elements surrounding the target picture element, the target picture element being one picture element data of an image signal;

(2) feature parameter computing means for computing plural feature parameters based on the image data in the local block stored in the block memory;

(3) identification processing means for outputting region identification information indicating a region where the target picture element in the local block is located based on inputs respectively representing feature parameters computed by the feature parameter computing means; and (4) filtering means for selecting a filter among various spatial-filtering-use filters based on an output from the identification processing means and applying a spatial-filtering process to the target picture element, wherein the identification processing means divides a plane or a multi-dimensional space having axes of the plural feature parameters into the character region, the photographic region and the dot region by non-linear boundaries and outputs respective region identification information according to each input of the plural feature parameters.

According to the above arrangement, the image signal inputted to the image processing apparatus is stored in a block memory which is divided into local blocks, each local block being composed of a target picture element and plural picture elements surrounding the target picture element. Then, the feature parameter computing means computes each of the plural feature parameters respectively representing the features of the character region, the photographic region and the dot region based on the image data read from the local block.

As a conventional method, Japanese Laid-Open Patent Publication No. 147860/1987 (Tokukaisho 62-147860) discloses an intermediate-tone facsimile signal processing method wherein two feature parameters are respectively computed. In this method, however, each feature parameter is classified separately by comparing it with a threshold that is predetermined for each feature parameter.

In contrast, in the described method of the present invention, a multi-dimensional space having the axes of the plural feature parameters is divided into the character region, the photographic region, and the dot region by the non-linear boundaries, and a multi-dimensional identification process is enabled by the identification processing means which outputs the corresponding region identification information in response to each input of the plural feature parameters. Namely, in the method of the present invention, the identification process is performed not by setting a threshold for each feature parameter but based on non-linear boundaries based on which divides the multi-dimensional space.

In addition, the identification processing means may be composed of the neural network which learned beforehand so as to receive each input of the plural feature parameters and output the region identification process or the look up table which describes an input/output correlation of the neural network.

According to the described method, even if an identification cannot be performed with a desired accuracy when considering only one feature parameter, by taking plural feature parameters into consideration, the identification of the region where the target picture element is located can be performed with an improved accuracy. Furthermore, by adopting the neural network which receives each input of the plural feature parameters or the look up table which describes the input-output correlation of the neural network, the image identification process can be preformed with a still improved accuracy.

As described, since the spatial-filtering process is performed with respect to the target picture element based on the result of image identification performed with high accuracy by the identification processing means, an optimal process according to the features of each picture element can be attained, thereby achieving a high quality image.

The image processing apparatus in accordance with the present invention may be arranged such that the region identification information outputted from the identification processing means represents the respective likelihoods that the target picture element is located in the character region, the photographic region, and in the dot region, and that the filtering means determines a filter factor for each picture element to be processed based on the data converted in the form of a numeral representing each of the above likelihoods, to perform the spatial-filtering process.

Namely, by adopting the identification processing means composed of the neural network or the look up table describing the input-output correlation of the neural network, the respective likelihoods that the target picture element is located in the character region, the photographic region and the dot region can be outputted in the form of a numeral. Further, by setting each filter factor by the filtering means based on the output converted in the form of a numeral, a fine spatial-filtering process for each picture element is enabled.

Especially, the described feature that each likelihood that the target picture element is located in each region in the form of a numeral offers the following effect. That is, the arrangement enables to attain the information indicating that it is difficult to identify that the target picture element is located in which one of the character region, the photographic region and the dot region. Furthermore, by applying the filtering process such as a combined process of the enhancement process and the smoothing process for the picture element that cannot be identified, the deterioration of the image quality due to the identification error can be prevented, thereby ensuring a high quality image.

The image processing apparatus in accordance with the present invention may be arranged so as to further include memory means for storing contents of spatial-filtering processes applied to the plural picture elements surrounding the target picture element, wherein the filtering means determines a content of the spatial-filtering process to be applied to the target picture element based on not only the region identification information outputted from the identification processing means but also the contents of the spatial-filtering processes applied to the picture elements surrounding the target picture element.

Since each of the character region, the photographic region and the dot region has a certain area, by taking the contents of the spatial-filtering processes applied to the picture elements surrounding the target picture element into consideration as in the described arrangement, even if an error occurs in identifying the region where the target picture element is located, an adverse effect from the identification error can be suppressed to some extent, and a change in texture on the boundaries which divide the image into regions can be reduced.

For a fuller understanding of the nature and advantages of the invention, reference should be made to the ensuing detailed description taken in conjunction with the accompanying drawings.

BRIEF DESCRIPTION OF THE DRAWINGS

FIG. 2 is an explanatory view illustrating one example of a filter factor of an enhancement filter adopted in a filtering circuit of FIG. 1.

FIG. 3 is an explanatory view illustrating one example of a filter factor of a smoothing filter adopted in the filtering circuit of FIG. 1.

FIG. 7(a) and FIG. 7(b) are views schematically illustrating a structure of a neural network adopted as the identification circuit of FIG. 6, wherein:

FIG. 7(a) illustrates a structure of a neural network, and

FIG. 7(b) illustrates a structure of each neural element of the neural network.

FIG. 11(a) and FIG. 11(b) are views schematically illustrating a structure of a neural network adopted in the identification circuit of FIG. 10, wherein:

FIG. 11(a) illustrates a structure of the neural network; and

FIG. 11(b) illustrates a structure of each neural element of the neural network.

FIG. 12 is an explanatory view showing one example of a filter factor of a filter provided with a combined function of an enhancement function and a smoothing function for use in the filtering circuit of FIG. 9.

DESCRIPTION OF THE EMBODIMENTS

The following description will discuss one embodiment of the present invention in reference to FIG. 1 through FIG. 6, and FIGS. 7(a) and (b).

Figure 1:
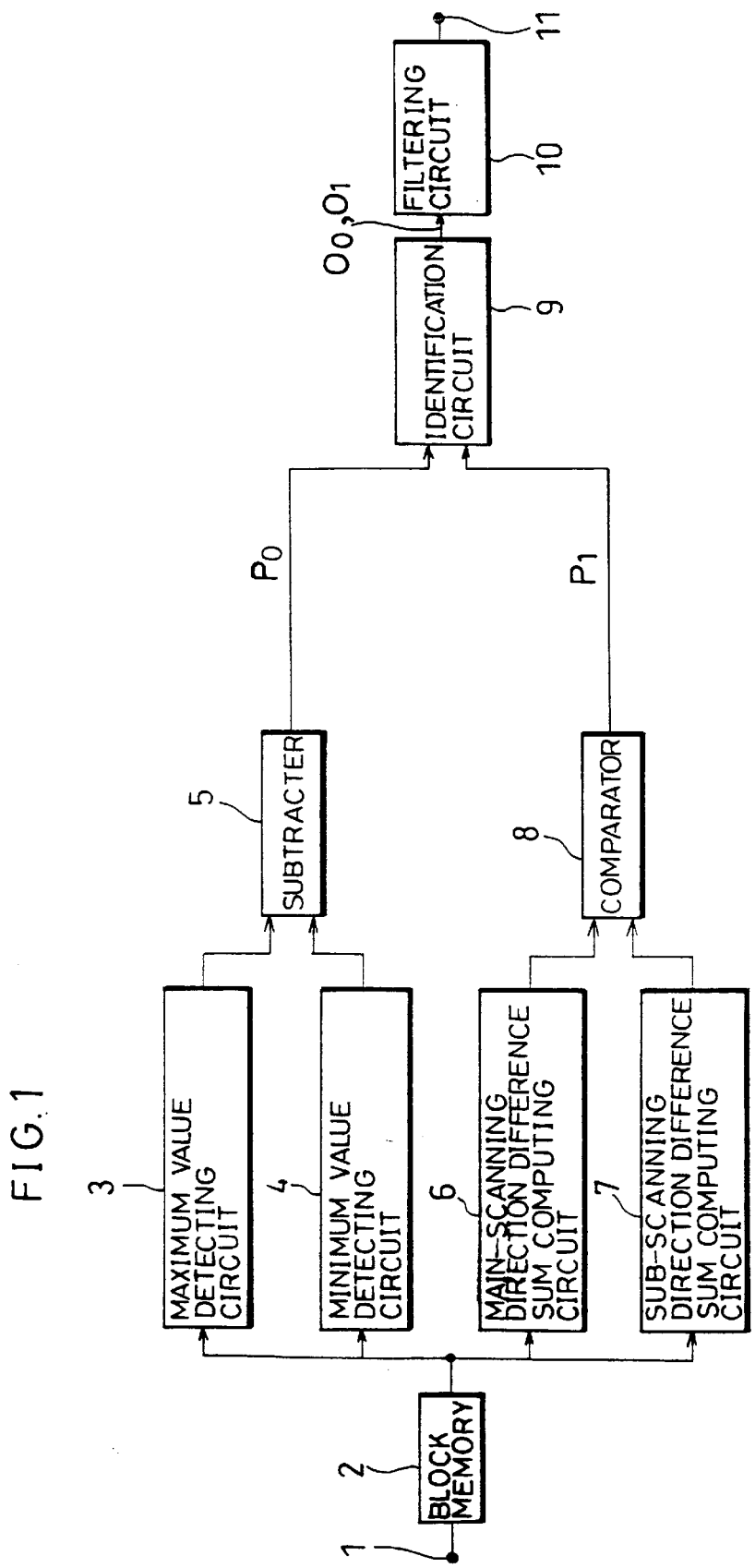
FIG. 1 which shows one embodiment of the present invention is a block diagram illustrating a schematic configuration of an image processing apparatus.

As shown in FIG. 1, an image processing apparatus in accordance with the present embodiment includes an input terminal 1, a block memory 2, a maximum value detecting circuit 3, a minimum value detecting circuit 4, a subtracter 5, a main-scanning direction difference sum computing circuit 6, a sub-scanning direction difference sum computing circuit 7 and a comparator 8. The maximum value detecting circuit 3, the minimum value detecting circuit 4, the subtracter 5, the main-scanning direction difference sum computing circuit 6, the sub-scanning direction difference sum computing circuit and the comparator 8 serve as feature parameter computing means. The image processing apparatus also includes an identification circuit 9 (identification processing means), a filtering circuit 10 (filtering means), and an output terminal 11.

The block memory 2 includes a memory area for storing an image signal of plural lines inputted from the input terminal 1 in 256 tones (8 bits) for each picture element. The block memory 2 stores therein an image signal in a local block composed of a target picture element and plural picture elements surrounding the target picture element.

The maximum value detecting circuit 3 is provided for detecting a maximum signal level of the image signal in the local block, that is stored in the block memory 2. The minimum value detecting circuit 4 is provided for detecting a minimum signal level of the image signal in the local block. The subtracter 5 is provided for computing a difference between the maximum signal level and the minimum signal level as a first feature parameter $P_0$.

The main-scanning direction difference sum computing circuit 6 is provided for accumulating each difference between every two picture elements which are in sequence in a main-scanning direction in the local block to obtain a sum of the differences. The sub-scanning direction difference sum computing circuit 7 is provided for accumulating each difference between every two picture elements which are in sequence in a sub-scanning direction in the local block to compute a sum of the differences. The comparator 8 compares the sum of the differences in the main-scanning direction with the sum of the differences in the sub-scanning direction, and determines the one which gives a smaller value (minimum value) to be a second feature parameter $P_1$.

The identification circuit 9 is provided for determining that the target picture element in the local block is located in which one of the character region, the photographic region and the dot region based on the first feature parameter $P_0$ and the second feature parameter $P_1$, and outputting an identification signal according to the region.

The filtering circuit 10 selects an optimum filter based on the output from the identification circuit 9 and also applies the spatial-filtering process to an input signal. The filtering circuit 10 includes a smoothing filter for smoothing the target picture element by taking a weighted mean between the target picture element and the picture elements surrounding the target picture element to compensate for a change in signal level between the target picture element and the picture elements surrounding the target picture element and an enhancement filter for enhancing a change in signal level between the target picture element and the picture elements surrounding the target picture element by adding a difference in signal level from the surrounding picture elements to the target picture element.

The filtering circuit 10 of the present embodiment is arranged so as to select the enhancement filter or the smoothing filter respectively having each predetermined filter factor and applies the enhancement or smoothing process to the target picture element. FIG. 2 illustrates an example of the filter factor of the enhancement filter to be adopted in the filtering circuit 10. FIG. 3 illustrates an example of the filter factor of the smoothing filter. Other than those shown in FIG. 2 and FIG. 3, the enhancement filter or the smoothing filter with a freely set mask size or a filter factor may be used.

Figure 4:
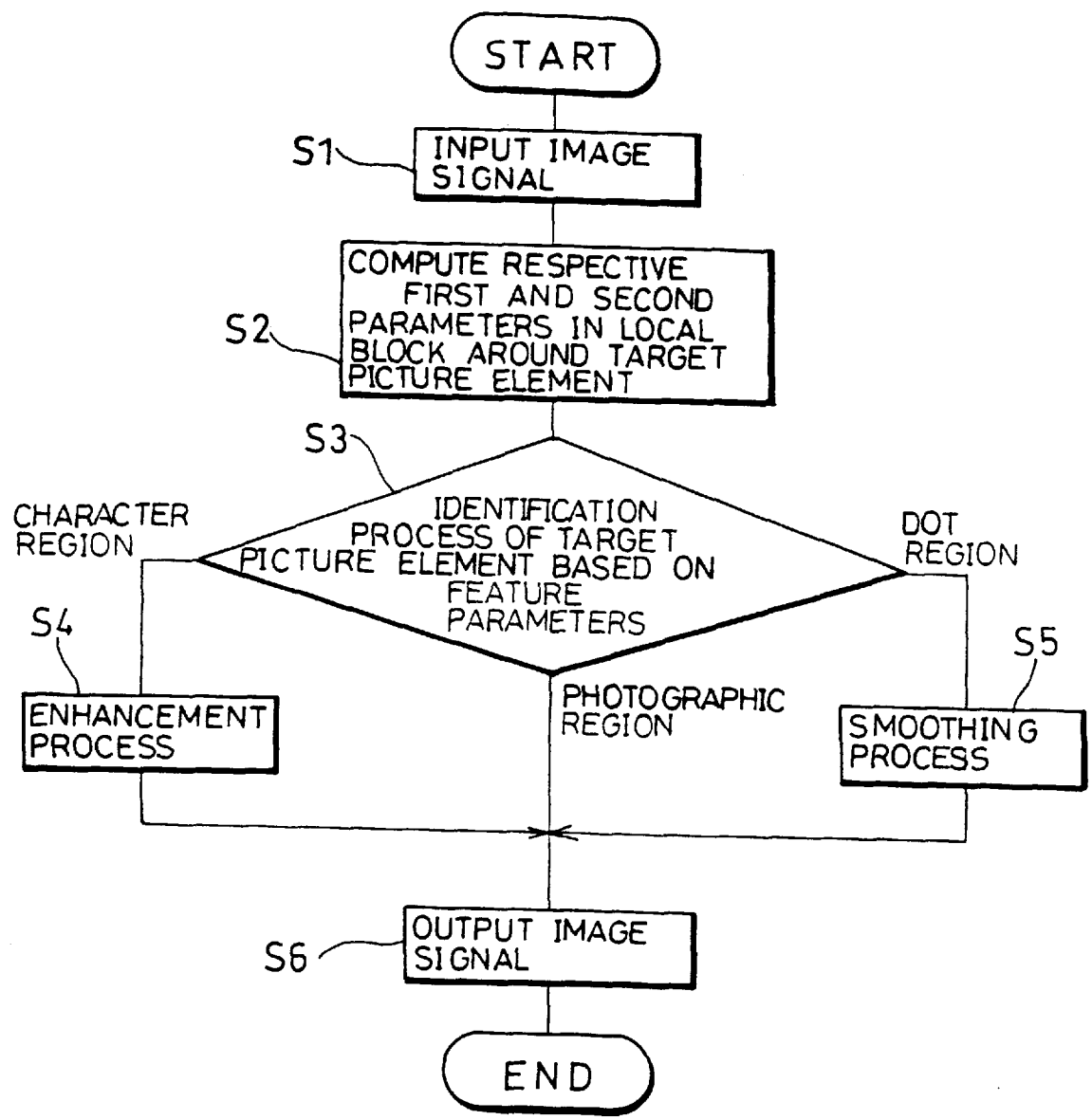
FIG. 4 is a flowchart showing an image processing process of the image processing apparatus.

FIG. 4 is a flowchart showing the spatial-filtering process to attain an improved quality of the recording image in the described arrangement. When an image signal obtained by scanning a document by an image reading section including a CCD image sensor is inputted to the image processing device (S1), an image signal in the local block including the target picture element at the center is stored in the block memory 2 of FIG. 1. Then, the first and second feature parameters $P_0$ and $P_1$ in the local block are computed by the maximum value detecting circuit 3, the minimum value detecting circuit 4, the subtracter 5, the main-scanning direction difference sum computing circuit 6, the sub-scanning direction difference sum computing circuit 7 and the comparator 8 (S2). Thereafter, the identification circuit 9 determines that the target picture element is located in which one of the character region, the photographic region or the dot region based on each feature parameter (S3). If the target picture element is located in the character region, the enhancement process is applied using the enhancement filter (S4). If the target picture element is located in the dot region, after the smoothing process is applied in the filtering circuit 10 using the smoothing filter (S5), an image signal is outputted from the output terminal 11 (S6). On the other hand, if the target picture element is located in the photographic region, the input image signal is outputted directly from the output terminal 11 without applying thereto the spatial-filtering process (S6). The image processing apparatus sequentially applies the described process to all the picture elements.

Figure 5:
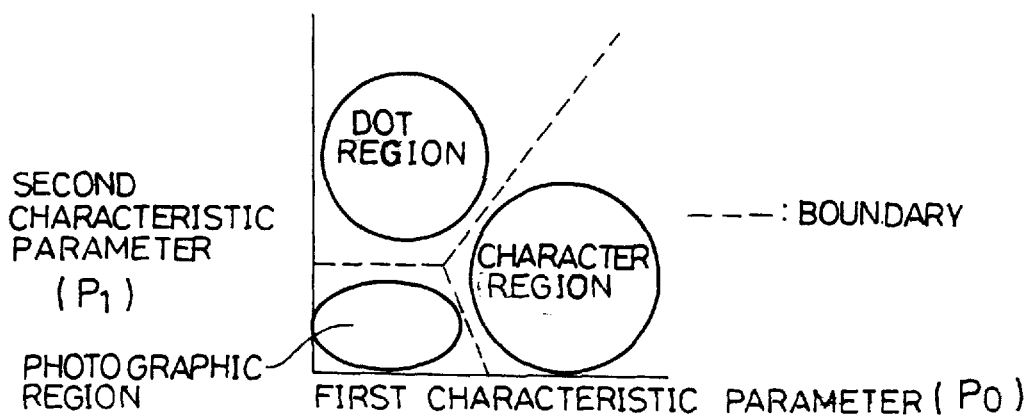
FIG. 5 is an explanatory view illustrating an example of distribution of a feature parameter of a picture element and an example of a boundary which divides a two-dimensional space having axes of two feature parameters into a character region, a photograph region and a dot region.

FIG. 5 illustrates an example distribution of the feature parameters of the picture elements in each of the character region, photographic region and the dot region and an example of boundaries which divide a two-dimensional plane into regions. This two-dimensional plane has an axis of the first feature parameter $P_0$ (difference between the maximum signal level and the minimum signal level in the local block composed of the target picture element and plural picture elements surrounding the target picture element) and an axis of the second feature parameter $P_1$ (the smaller one of the sum of the differences in signal level in the main-scanning direction between every two picture elements which are in sequence in the block and the sum of the differences in signal level in the sub-scanning direction between every two picture elements which are in sequence in the local block). This process of classifying the two-dimensional plane is performed by the identification circuit 9.

Figure 6:
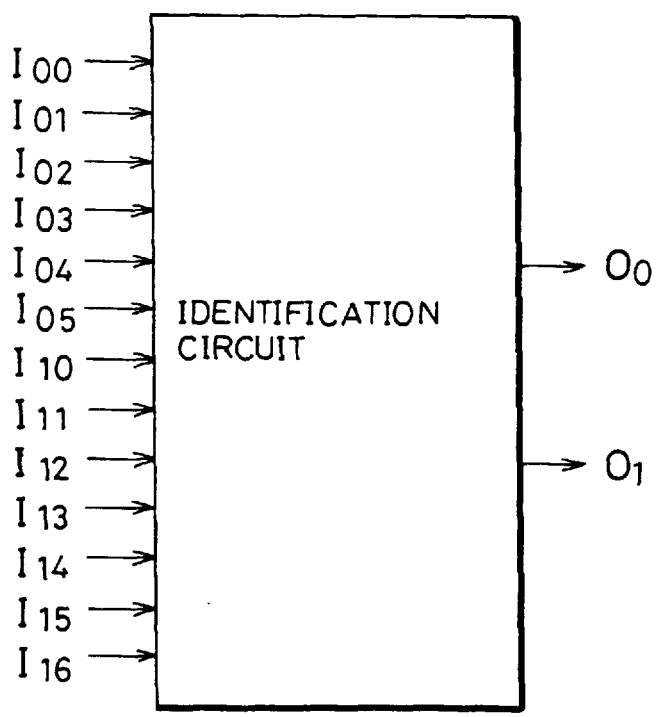
FIG. 6 is a view schematically illustrating a structure of an identification circuit of FIG. 1.

The structure of the identification circuit 9 is illustrated in FIG. 6. Here, explanations will be given through the case where the local block size of 5 picture elements×5 picture elements is adopted. In the identification circuit 9, the input of the first feature parameter $P_0$, a 6-bit signal, more precisely 6 bits ($I_{00}$–$I_{05}$ in the figure) from the top out of 8 bits are used. The input of the second feature parameter $P_1$ is a 7 bit signal, more specifically 7 bits ($I_{10}$–$I_{16}$ in the figure) from the top out of 10 bits are used. The outputs $O_0$ and $O_1$ are 2-bit identification signals for identifying that the target picture element is located in which one of the character region, the photographic region and the dot region. For example, when the result of identification by the identification circuit 9 determines that the target picture element is located in the character region, an identification value "0" for selecting an enhancement process (in the figure $O_0$=0 and $O_1$=0) is outputted from the identification circuit 9. When the result of identification by the identification circuit 9 determines that the target picture element is located in the photographic region, an identification value "1" for applying no spatial-filtering process (in the figure $O_0$=1, and $O_1$=0) is outputted from the identification circuit 9. Similarly, when the result of identification by the identification circuit 9 determines that the target picture element is located in the dot region, an identification value "2" for selecting a smoothing process (in the figure $O_0$=0, and $O_1$=1) is outputted.

The numerals used in the input of the identification circuit 9 is not limited to the above. However, it should be noted here that although the preciseness in identification is improved as the number of bits in the input increases, the speed of processing is lowered and a cost is increased on the contrary. Therefore, an optimal number of bits in the input is to be selected by taking all of the above-mentioned factors into consideration.

For the identification circuit 9, a two-dimensional look up table describing input/output characteristics by the neural network or the neural network itself may be used. The described neural network may be a four-layer perceptron shown in FIG. 7(a). In the input layer, a normalized first feature parameter $P_0$ and a normalized second feature parameter $P_1$ are respectively inputted to $I_0$ and $I_1$. In the output layer, an identification value O for selecting the spatial-filtering process is outputted.

Here, it is arranged such that each neural element of the input layer is connected to all the input neural elements of the intermediate layer, and each output neural element of the intermediate layer is connected to all the input neural elements of the output layer.

Figure 7A:
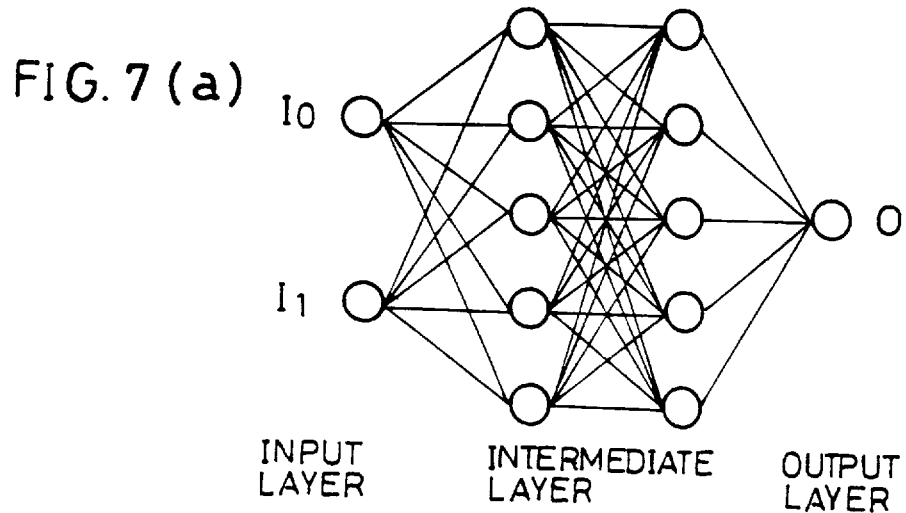
Figure 7B:
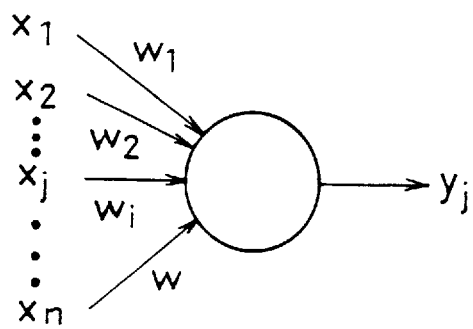

As shown in FIG. 7(b), each neurons element is an element of plural inputs and single output. Each neural element performs a summing and multiplying operation of the formula (1). Further, each neural element outputs a value $y_i$ using the result $X_j$ of this operation as an input of a sigmoid function of the formula (2) wherein an input value of each neural element is denoted as $x_i$ and each weighted factor is denoted as $w_{ij}$.

$$Xj = \sum_{i=1}^{n} w_{ij} \times xi \quad (1)$$

$$yj = f(Xj) = \frac{1}{1 + \exp(-xj)} \quad (2)$$

In the case of adopting the neural network which learned well beforehand, when the first feature parameter $P_0$ and the second feature parameter $P_1$ obtained in the character region are inputted to the output layer, the identification value O approximates to "0" is outputted therefrom. On the other hand, when the first feature parameter $P_0$ and the second feature parameter $P_1$ obtained from the photographic region are inputted to the input layer, the identification value O which approximates to "1" is outputted therefrom. Similarly, when the first feature parameter $P_0$ and the second feature parameter $P_1$ obtained from the dot region are inputted to the output layer, the identification value 0 which approximates to "2" is outputted therefrom.

In the neural network which determines the input/output characteristics of the two-dimensional look up table, each neural element of the input/output layer is 8-bit signal. On the other hand, in the case of adopting the neural network itself as the identification circuit, the number of bits of each neural element of the input/output layer corresponds to the number of bits of each input/output of the identification circuit of FIG. 6.

The type of the neural network is not limited to that shown in FIG. 7(*a*). Namely, the number of intermediate layers of the neural network and the number of neural elements in the intermediate layer are selected at random, and a neural network of other type may be adopted.

Example of a filtering process by a filtering circuit 10 based on the identification signal outputted from the identification circuit 9 will be explained. The filtering circuit 10 applies an enhancement process to the target picture element using the enhancement filter illustrated in FIG. 2 upon receiving an identification signal (identification value "0") indicating that the target picture element is located in the character region in order to make characters and/or lines brighter. On the other hand, the filtering circuit 10 applies a smoothing process to the target picture element using a smoothing filter illustrated in FIG. 3 upon receiving an identification signal (identification value "2") indicating that the target picture element located in the dot region in order to reduce the dot frequency element to prevent moire. Similarly, the filtering circuit 10 outputs an input signal without applying a filtering process upon receiving an identification signal (identification value "1") indicating that the target picture element is located in the photographic region from the identification circuit 9.

Similarly, in the case of considering the contents of filtering processes applied to the picture elements surrounding the target picture element, the following technique may be adopted.

That is, the filtering circuit 10 stores the contents of the filtering processes applied to the picture elements (enhancement process, smoothing process or neither process is applied), and a filter is selected in consideration of not only the identification signal from the identification circuit 9 but also the content of the filtering process lastly applied to the picture element. More concretely, when the enhancement process is applied to the picture element directly before processing the target picture element, the filtering circuit 10 either applies the enhancement process to the input signal or outputs the input signal without applying the filtering process even if an identification signal indicating that the target picture element is located in the character region is not received from the identification circuit 9. If the identification signal indicates that the target picture element is located in the photographic region, the enhancement process is applied to the input signal. On the other hand, if the identification signal indicates that the target picture element is located in the dot region, a filtering process is not applied. Similarly, when the smoothing process is applied to the picture element directly before processing the target picture element, the filtering circuit 10 either applies the smoothing process to the input signal or outputs the input signal without applying thereto the filtering process even if the identification signal indicating that the target picture element is located in the dot region is not received. If the identification signal indicates that the target picture element is located in the photographic region, the smoothing process is applied to the input signal, while if the identification signal indicates that the target picture element is located in the character region, the filtering process is not performed.

Alternatively, the filtering circuit 10 may be arranged such that with respect to previously processed n picture elements (n picture elements inversely counted from the target picture element to be currently processed), the respective number of picture elements having applied thereto the enhancement process and the number of picture elements having applied thereto the smoothing process are counted. In this arrangement, a filter is selected in consideration of not only the identification signal from the identification circuit 9 but also the count value (the content of the filtering process previously applied to the n picture elements). More concretely, the filtering circuit 10 compares $C_e$ and $C_s$ with a predetermined threshold wherein $C_e$ indicates the counted number of picture elements having applied thereto the enhancement process, and $C_s$ indicates the counted number of picture elements having applied thereto the smoothing process. As a result of this comparison, if $C_e$ is greater than the threshold value, even if the identification signal indicating that the target picture element is located in the character region is not received from the identification circuit 9, the filtering circuit 10 applies the enhancement process to the input signal, or directly outputs the input signal without applying thereto the filtering process. On the other hand, if $C_s$ is greater than the threshold value, even if the identification signal indicating that the target picture element is located in the dot region is not inputted from the identification circuit 9, the smoothing process is applied to the input signal, or the input signal is outputted without applying thereto the filtering process.

As described, according to the image processing apparatus in accordance with the present embodiment, the identification process is applied to the image signal obtained by scanning the document, to determine that each picture element is located in which one of the character region, the photographic region and the dot region. Then, based on the result of the identification process, a spatial-filtering process is applied to each picture element.

The image processing apparatus in accordance with the present embodiment includes:
(1) a block memory 2 for storing image data in a local block composed of a target picture element and plural picture elements surrounding the target picture element, the target picture element being one picture element data of an image signal;
(2) feature parameter computing means (maximum value detecting circuit 3, minimum value detecting circuit 4, subtracter 5, main-scanning direction difference sum computing circuit 6, sub-scanning direction difference sum computing circuit 7 and a comparator 8) for computing two feature parameters (first and second feature parameters $P_0$ and $P_1$) respectively representing features of the character region, the photographic region and the dot region based on the image data in the local block stored in the block memory;

(3) an identification circuit 9 (identification processing means) being composed of a neural network which learned beforehand and sets each of the character region, the photographic region and the dot region using boundaries including non-linear boundaries on the two-dimensional space having axes of the feature parameters $P_0$ and $P_1$ and identifying corresponding regions of each input of the two feature parameters, said identification circuit 9 outputting an identification signal indicating the region where the target picture element in the local block is located based on inputs representing respective feature parameters computed by the feature parameter computing means; and (4) a filtering circuit 10 (filtering means) for selecting a filter among filters of various types respectively having predetermined filter factors (enhancement filter and smoothing filter) based on an output from the identification circuit 9 and performing a spatial-filtering process.

This feature is referred to as the first feature.

The described arrangement offers a high-precision image identification. Namely, even if a sufficient identification precision cannot be ensured when considering only one feature parameter, by considering the two (plural) feature parameters, the identification process can be performed more accurately. Furthermore, in the case of performing the identification process based on the combination of plural feature parameters, it is important to obtain optimal boundaries for classifying into respective feature parameters to perform an identification with an improved accuracy. Here, by adopting the neural network, the optimal boundary including non-linear characteristics can be selected easily and precisely. In addition, as a multi-dimensional identification process is applied using the neural network, the image identification can be performed with very high precision.

Therefore, since an optimal spatial-filtering process according to the features of each picture element is enabled, a high quality image can be achieved. For example, when applying the image processing apparatus of the present invention to the image forming apparatus, such as a digital copying machine, etc., or a facsimile machine, etc., an improved quality of the recorded image can be achieved.

Moreover, the spatial-filtering process is applied by selecting a predetermined filter according to an identification signal indicating that the target picture element is located in which one of the character region, the photographic region and the dot region, thereby enabling a high-speed process.

The image processing apparatus in accordance with the present embodiment having the arrangement of the first feature may be arranged such that the identification circuit 9 in identification processing means (3) for outputting an identification signal for identifying that the target picture element in the local block is located in which one of the character region, the photographic region and the dot region, is not the neural network itself but identification processing means. The described arrangement is referred to as the second feature. The identification processing means outputs an identification signal indicating that the target picture element in the local block is located in which of the character region, the photographic region and the dot region using the two-dimensional look up table based on the input/output characteristics of the neural network.

As described, by reflecting the input/output characteristics of the neural network which learned beforehand to the look up table, the identification process can be performed with high precision at real time, thereby enabling a high-speed image process.

The image processing apparatus in accordance with the present embodiment having the arrangement of the first or the second feature may be arranged such that the feature parameter computing means computes the difference between the maximum signal level and the minimum signal level in the local block composed of plural picture elements including the target picture element and picture elements surrounding the target picture element as the first feature parameter $P_0$ by the maximum value detecting circuit 3, the minimum value detecting circuit 4 and the subtracter 5. The feature parameter computing means also compares the sum of the differences in signal level between every two picture elements which are in sequence in the main-scanning direction in the local block with the sum of the differences in signal level between every two picture elements which are in sequence in the sub-scanning in the local block, and as a result of this comparison, the smaller one of the two sums is determined to be the second feature parameter $P_1$. The feature of the described arrangement is referred to as the third feature.

Namely, by selecting the first and second parameters $P_0$ and $P_1$ which appropriately represent the features of each region, the high-precision identification process can be expected.

[EMBODIMENT 2]

Figure 8:
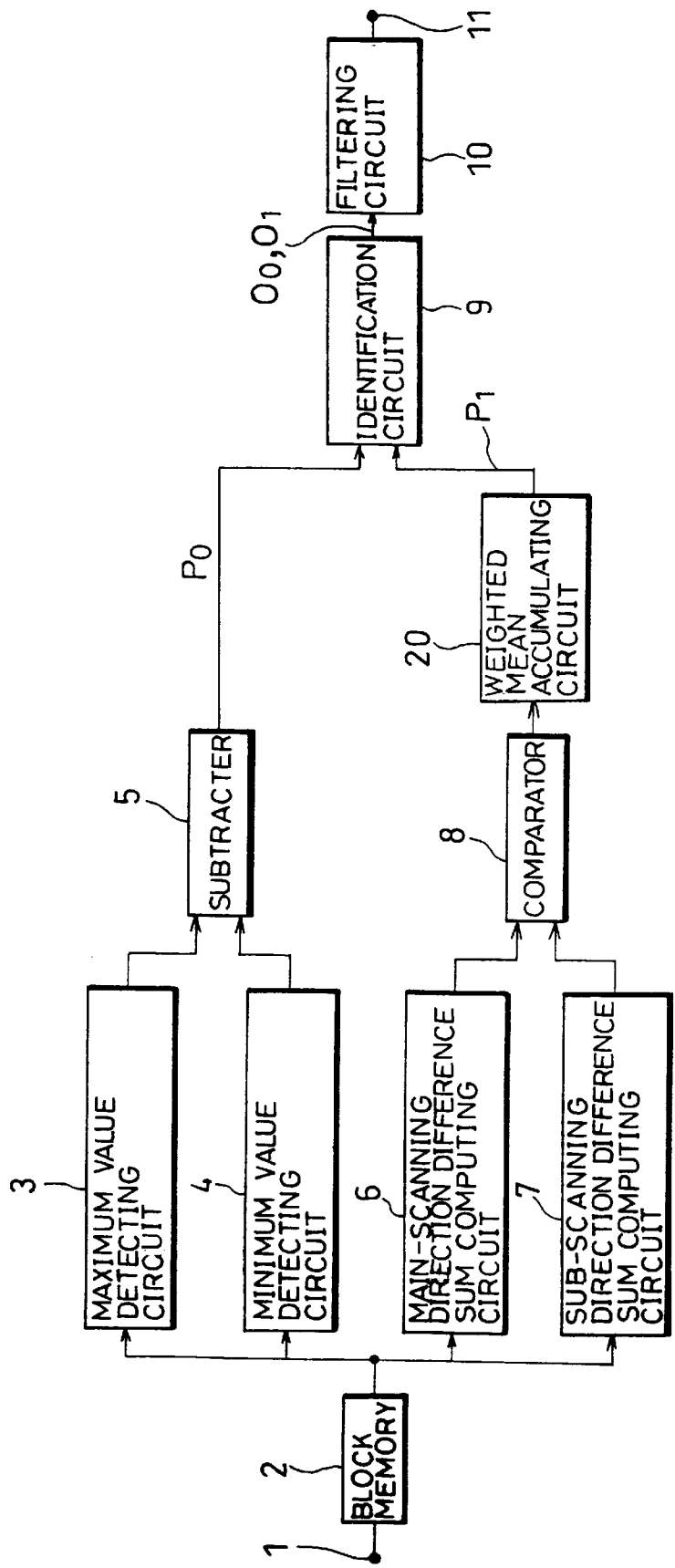
FIG. 8 which shows another embodiment of the present invention is a block diagram illustrating a schematic configuration of an image processing apparatus.

The following description will discuss another embodiment of the present invention in reference to FIG. 8. For convenience, members having the same configurations and functions will be designated by the same reference numerals and thus the descriptions thereof shall be omitted here.

As shown in FIG. 1, in the first embodiment, the sum of the differences in signal level between every two picture elements which are in sequence in the main scanning direction in a local block is compared with the sum of the differences in signal level between every two picture elements which are in sequence in the sub-scanning direction in the local block, and as a result of this comparison, the smaller one of the two sums is determined to be the second feature parameter $P_1$. While the second feature parameter $P_1$ is computed by the main-scanning direction difference sum computing circuit 6, the sub-scanning direction difference sum adding circuit 7 and a comparator 8. The resulting first and second parameters $P_0$ and $P_1$ are outputted to the identification circuit 9. In contrast, in the arrangement of the present embodiment, a weighted mean accumulating circuit 20 is formed between the comparator 8 and the identification circuit 9. In this weighted mean accumulating circuit 20, the weighted mean of the second feature parameter $P_1$ obtained by the comparator 8 and the second feature parameter $P_1$ in the previously processed local block is obtained, and the resulting weighted mean is outputted to the identification circuit 9 as the feature parameter of the second feature parameter $P_1$. Other than the above, the image processing apparatus of the present invention has the same arrangement as that of the first embodiment.

The following shows one example of the weighted mean computed by the weighted mean accumulating circuit 20.

The second feature parameter $P_1$ is obtained by formula (3).

$$P_1 = (2P_{1a} + P_{1b})/3 \qquad (3)$$

wherein $P_{1a}$ is the second feature parameter $P_1$ in the local block including the target picture element to which the filtering process is applied, and $P_{1b}$ is the second parameter $P_1$ in the previous local block.

In the formula (3), the weighted ratio of $P_{1a}$ and $P_{1b}$ is 2:1. However, the weighted ratio is not limited to the above ratio as long as the weight of $P_{1a}$ is greater than the weight of $P_{1b}$.

As described, the image processing apparatus in accordance with the present embodiment having the arrangement of the third feature of the first embodiment further includes the weighted mean accumulating circuit 20 for computing a weighted mean between the second feature parameter $P_1$ and the second feature parameter in the previous local block and outputting the resulting weighted mean to the identification circuit 9 as the second feature parameter. The feature of this arrangement is referred to as the fourth feature.

The described arrangement offers an improved image identification precision. Namely, since each of the character region, the photographic region and the dot region has a certain area, by considering not only the information of the local block to be currently processed but also the information of the surrounding local blocks, an image identification can be performed with an improved precision.

The image processing apparatus in accordance with the first or the second embodiment having the arrangement of the first or the fourth feature may includes memory means (not shown) for storing the contents of the spatial-filtering process applied to the picture elements surrounding the target picture element, and that based on not only the identification signal from the identification circuit 9 but also the information stored in the memory means, a predetermined filtering process is applied to the target picture element. The described arrangement is referred to as the fifth feature.

Since each of the character region, the photographic region and the dot region has a certain area, even if an error occurs in identifying the region where the target picture element is located when based on only the identification signal from the identification circuit 9, by considering also the contents of the filtering processes applied to the picture elements surrounding the target picture element, an adverse effect from this identification error can be suppressed to a certain degree, and a change in texture on the boundaries which divide a multi-dimensional space into regions can be suppressed.

[EMBODIMENT 3]

Figure 9:
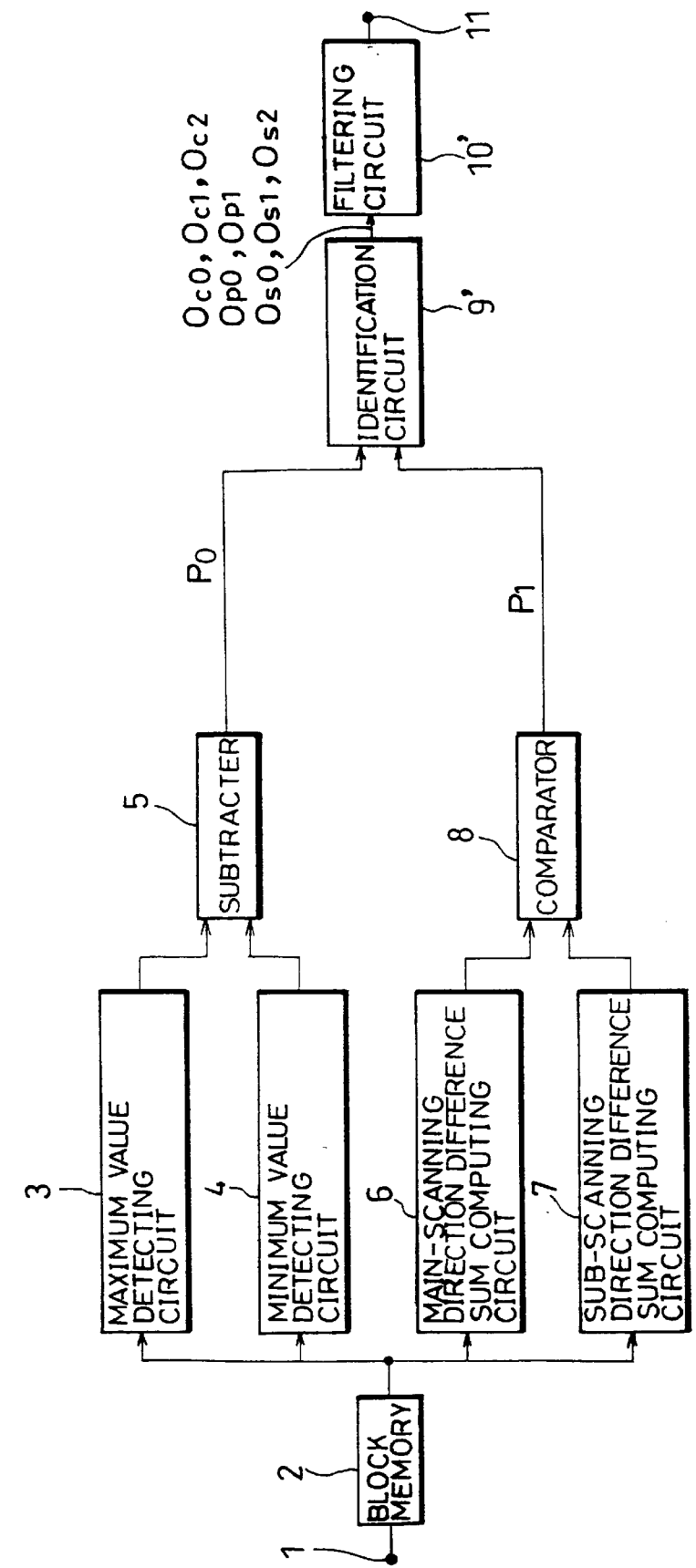
FIG. 9 which shows still another embodiment of the present invention is a block diagram illustrating a schematic configuration of the image forming apparatus.
Figure 10:
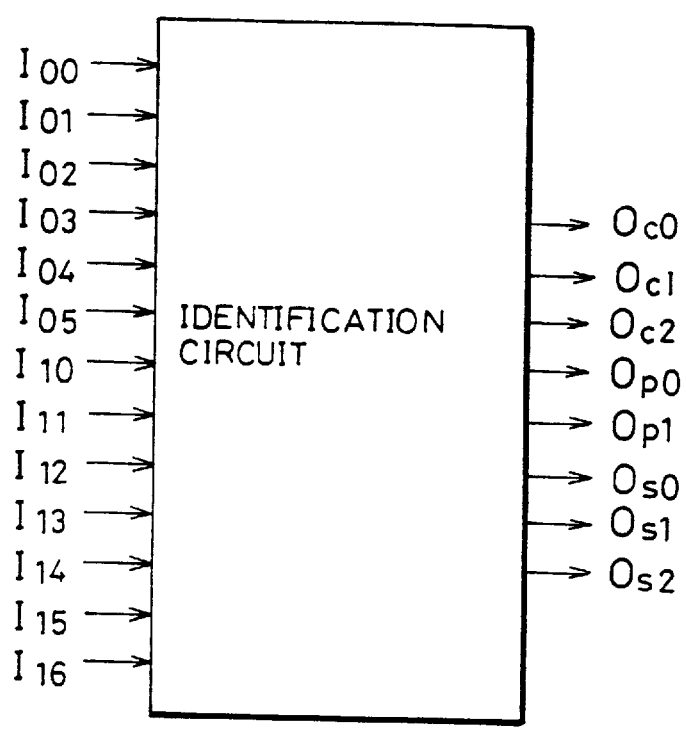
FIG. 10 is a view schematically illustrating a structure of an identification circuit shown in FIG. 9.
Figure 13:
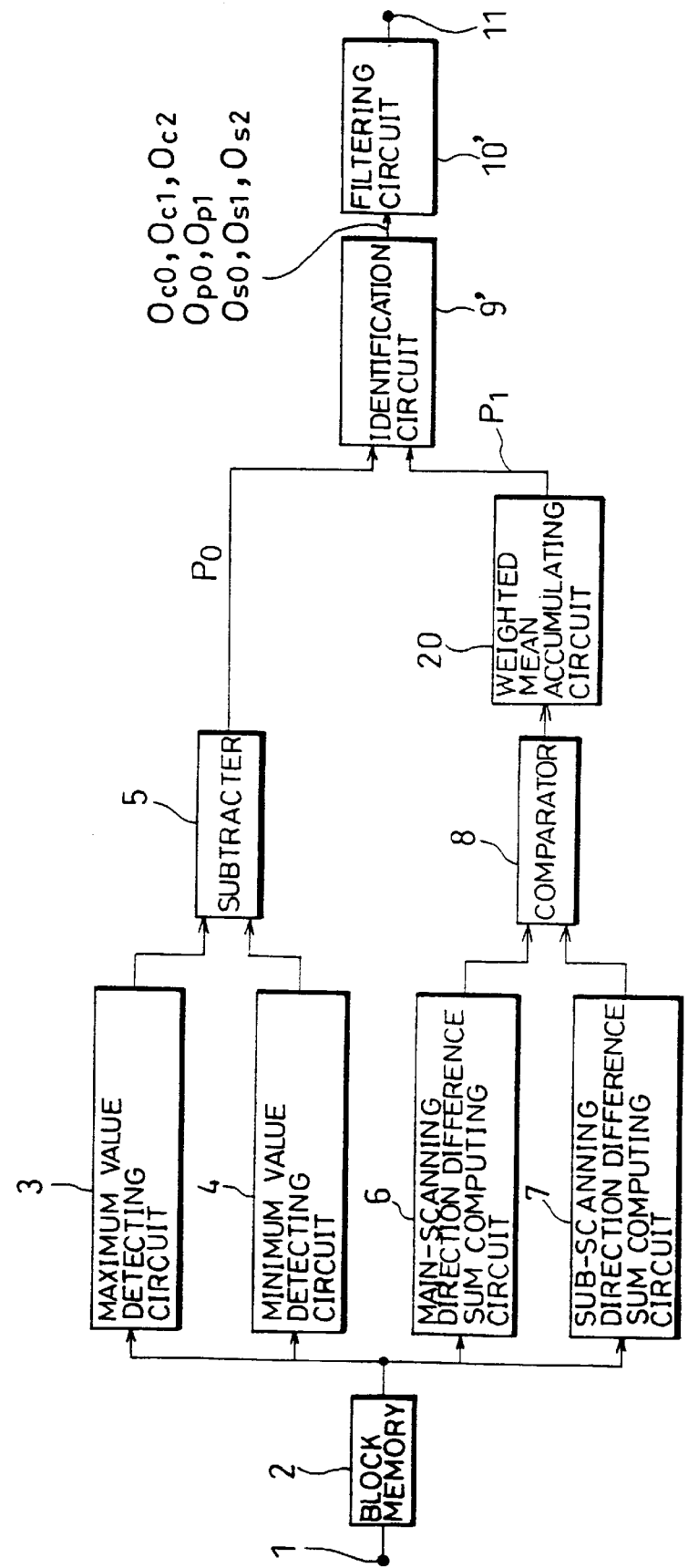
FIG. 13 which shows still another embodiment of the present invention is a block diagram illustrating a schematic configuration of the image processing apparatus.

The following descriptions will discuss one embodiment of the present invention in reference to FIG. 9 and FIG. 10, FIGS. 11(a) and (b) and FIGS. 12 and 13. For convenience in explanations, members having the same function as the aforementioned embodiment will be designated by the same reference numerals, and thus the description thereof shall be omitted here.

An image processing apparatus of the present embodiment adopts an identification circuit 9' (identification processing means) illustrated in FIG. 9 and a filtering circuit 10' (filtering means) in replace of the identification circuit 9 and the filtering circuit 10 of the image processing apparatus of the first embodiment illustrated in FIG. 1. Other than the above, the image processing apparatus of the present embodiment has the same arrangement as that of the first embodiment.

As shown in FIG. 1, the identification circuit 9 of the first embodiment outputs a 2-bit identification signal identifying that the target picture element is located in which one of the character region, the photographic region and the dot region. In contrast, the identification circuit 9' of the present embodiment outputs respective likelihoods that the target picture element is located in the character region, the photographic region and the dot region in a signal of 8-bit.

The structure of the identification circuit 9' of the present embodiment is illustrated in FIG. 10. Here, the example will be given through the case of adopting the local block size of 5 picture elements×5 picture elements. The input of the first feature parameter $P_0$ of the identification circuit 9' from the subtracter 5 shown in FIG. 9 is a signal of 6-bit, more precisely, 6 bits ($I_{00}$–$I_{05}$ in the figure) from the top out of 8 bits are used. The input of the second feature parameter $P_1$ from the comparator 8 shown in FIG. 9 is a signal of 7-bit, more precisely, 7 bits from the top out of 10 bits ($I_{00}$–$I_{06}$ in the figure) are used.

The output value from the identification circuit 9' is 8-bit in total including an output of 3-bit ($O_{c0}$–$O_{C2}$) representing the likelihood that the target picture element is located in the character region, an output of 2-bit ($O_{p0}$ and $O_{p1}$ in the figure) representing the likelihood that the target picture element is located in the photographic region, and an output of 3-bit ($O_{s0}$–$O_{s2}$ in the figure) representing the likelihood that the target picture element is located in the dot region.

The respective numbers of bits in the input/output signal of the identification circuit 9' can be selected at random, and they are not limited to the above. However, it should be noted here that, the higher the precision is, the greater the number of bits in the input/output signal. However, the processing speed is lowered and the cost increases on the contrary. Thus, the optimal number of bits is to be selected in consideration of the above conditions.

For the identification circuit 9', the two-dimensional look up table having predetermined input/output characteristics by the neural network or the neural network itself may be used. The described neural network may be a four layer perceptron. To the input layer, $I_0$ and $I_1$ respectively obtained by regulating the first feature parameter $P_0$ and the second feature parameter $P_1$ are inputted. From the output layer, numerals respectively representing the likelihood that the target picture element is located in the character region, the photographic region and the dot region are outputted respectively as $O_c$, $O_p$ and $O_s$.

It is arranged such that each neural element of the input layer is connected to all the input neural elements of the intermediate layer, and each output neural element of the intermediate layer is connected to all the input neural elements of the output layer.

As shown in FIG. 11(b), each neural element is an element of multi-input and single-output. Each neural element performs a summing/multiplying operation of the formula (1) and outputs a value $Y_i$ using the result $X_j$ of the summing/multiplying operation as an input of the sigmoid function of the formula (2), wherein $x_i$ is an input value of each neural element, and $w_{ij}$ is a weighted factor.

In the well-learned neural network, when $P_0$ and $P_1$ of the character region are inputted, from the output layer, $O_c$, $O_p$ and $O_s$ approximate to 1, 0 and 0 respectively are outputted, while when $P_0$ and $P_1$ of the photographic region are inputted, the $O_c$, $O_p$ and $O_s$ approximate to 0, 1 and 0 respectively are outputted. When the $P_0$ and $P_1$ are inputted, the $O_c$, $O_p$ and $O_s$ respectively approximate to 0, 0 and 1 are outputted from the output layer.

In the neural network for determining the input/output characteristics of the two-dimensional look up table, an 8-bit neural element of the input-output layer is adopted. In the case of using the neural network itself as the identification circuit, the number of bits of each neural element of the input-output layer corresponds to the number of bits in an input/output signal of the identification circuit shown in FIG. 10.

The type of the neural network is not limited to that shown in FIG. 11(a). Namely, the number of intermediate layers and the number of neural elements in each intermediate layer of the neural network can be selected as desired, and the neural network of other type may be adopted.

An example of the filtering process of the filtering circuit 10' based on the output from the identification circuit 9' will be explained.

The filtering circuit 10' determines that the target picture element is located in the character region when the output $O_c$ representing the likelihood that the target picture element is located in the character region is greater than the predetermined threshold, and the output $O_p$ and the output $O_s$ respectively representing the likelihood that the target picture element is located in the photographic region and the dot region are smaller than the predetermined threshold. In such case, to make the character or the line brighter, the enhancement process is applied to the target picture element using the enhancement filter illustrated in FIG. 2.

The filtering circuit 10' determines that the target picture element is located in the dot region when the output $O_s$ representing the likelihood that the target picture element is located in the dot region is greater than the predetermined threshold, and the output $O_c$ and the output $O_p$ respectively representing the likelihood that the target picture element is located in the character region and the photographic region are smaller than the predetermined threshold. In such case, to reduce the dot frequency component to prevent moire, the enhancement process is applied to the target picture element using the enhancement filter illustrated in FIG. 3.

The filtering circuit 10' either outputs an input image signal without applying thereto a filtering process or performs a filtering process using a filter provided with a combination of an enhancement function and a smoothing function shown in FIG. 12 in the case where there is no significant difference among outputs $O_c$, $O_p$ and $O_s$ from the identification circuit 9' representing the respective likelihoods, and none of these outputs $O_c$, $O_p$ and $O_s$ is greater than the predetermined threshold, thereby avoiding an adverse effect on the image by the identification error.

In the case of applying a filtering process considering the contents of filtering processes applied to the picture elements surrounding the target picture element, the following technique may be adopted.

The filtering circuit 107 stores the contents of the filtering process (enhancement process, smoothing process or neither process is applied) applied to the picture elements, and based on the contents of the previously applied filtering process, the output representing each likelihood from the identification circuit 9' is corrected to select a filter. More concretely, in the case where the enhancement process is applied to the picture element directly before processing the target picture element, $O_c$ is newly obtained by adding a predetermined value $\alpha_c$ to the numeral $O_c$ representing the likelihood that the target picture element is located in the character region from the identification circuit 9'. On the other hand, in the case where the smoothing process is applied to the picture element directly before processing the target picture element, $O_s$ is newly obtained by adding a predetermined value $\alpha_s$ to $O_s$ representing the likelihood that the target picture element is located in the character region. Then, based on corrected $O_c$ and $O_s$ in the described manner, a filter is selected to execute the filtering process.

Alternatively, the filtering circuit 10' counts respective number of picture elements having applied thereto the enhancement process and the number of picture elements having applied thereto the smoothing process with respect to n-picture elements (n picture elements inversely counted from the picture element to be currently processed) and selects a filter based on these count values (i.e., considering the contents of the filtering processes applied to n picture elements inversely counted from the target picture element). Assumed here that the count value of the picture elements having applied thereto the enhancement process is designated by $C_e$, and the count value of picture elements having applied thereto the smoothing process is designated by $C_s$. The filtering circuit 10' compares $C_e$ and $C_s$ with the predetermined threshold. Then, if $C_e$ is greater than the threshold, the filtering circuit 10' either applies the enhancement process to the input signal, or outputs the input signal without applying thereto the filtering process even when $O_c$ representing the likelihood that the target picture element is located in the character region is smaller than the predetermined threshold. In this case, if $O_s$ representing the likelihood that the target picture element is located in the dot region is larger than the predetermined threshold, the filtering process will not be applied. On the other hand, if $O_p$ representing the likelihood that the target picture element is located in the photographic region is greater than the threshold, or there is no significant difference among outputs $O_c$, $O_p$ and $O_s$ from the identification circuit 9', the enhancement process is applied to the input signal. If $C_s$ is greater than the predetermined threshold, even if the value $O_s$ representing the likelihood that the target picture element is located in the dot region, the filtering circuit 10' either applies a smoothing process to the input signal, or outputs the input signal without applying thereto the filtering process. In this case, if the value $O_c$ representing the likelihood that the target picture element is located in the character region is greater than the threshold, the filtering process will not be applied. On the other hand, if $O_p$ representing the likelihood that the target picture element is located in the photographic region, or there is no significant difference in outputs $O_c$, $O_p$ and $O_s$ from the identification circuit 9', the filtering circuit 10' applies the smoothing process to the input signal.

Alternatively, it may be arranged such that as shown in FIG. 13, a weighted mean accumulating circuit 20 is formed between the comparator circuit 8 and the identification circuit 9', and the weighted mean accumulating circuit 20 computes a weighted mean of the feature parameter of the second feature parameter $P_1$ computed by the comparator and the feature parameter $P_1$ in the previous local block and outputs the resulting weighted mean to the feature parameter of the second feature parameter $P_1$ to the identification circuit 9' as new second feature parameter $P_1$.

As described, the image processing apparatus in accordance with the present embodiment is arranged so as to perform the identification process for determining each picture element is located in which one of the character region, the photographic region and the dot region with respect to the image signal obtained by scanning the document, and performs the spatial-filtering process with respect to each picture element according to the result of this identification process.

The image processing device is arranged so as to include:

(5) a block memory 2 for storing the image data of a local block composed of a target picture element and plural picture elements surrounding the target picture element, the target picture element being one image data of an image signal;

(6) feature parameter computing means (maximum value detecting circuit 3, a minimum value detecting circuit 4, a subtracter 5, a main-scanning direction difference sum computing circuit 6 and a sub-scanning direction difference sum computing circuit 7 and a comparator 8) for computing each of two feature parameters (first and second feature parameters $P_0$ and $P_1$) representing respective features of the character region, the photographic region and the dot region of the image data in the local block stored in the block memory;

(7) identification circuit 9' (identification processing means) being composed of a neural network which learned beforehand to select each of the feature region, the photographic region and the dot region using the non-linear boundary of the two-dimensional plane having the axes of the feature parameters $P_0$ and $P_1$ which learned beforehand so as to enable it to represent the likelihood that the target picture element is located in each region in the form of numeral based on the input of each of the two feature parameters $P_0$ and $P_1$, for outputting the respective likelihoods that the target picture element is located in the character region, the photographic region and the dot region based on each input of the two feature parameters computed by the feature parameter computing means; and (8) a filtering circuit 10' (filtering means) for selecting each filter (enhancement filter, smoothing filter) respectively having predetermined filter factors, based on an output from the identification circuit 9' and performing the spatial-filtering process.

As described, since multi-dimensional identification process is performed using the neural network, as in the case of the first feature of the first embodiment, the identification of the image can be performed with very high precision, thereby achieving the high quality image by applying the optimum spatial-filtering process. Furthermore, since the likelihood of each region is represented by a numeral, the information indicating that it is difficult to determine that the target picture element is located in which one of the character region, the photographic region and the dot region can be obtained, and by applying an appropriate process such as a combined process of the enhancement process and the smoothing process to such picture element, the deterioration of the image quality by the identification error can be prevented, thereby achieving a still improved image quality.

[EMBODIMENT 4]

Figure 14:
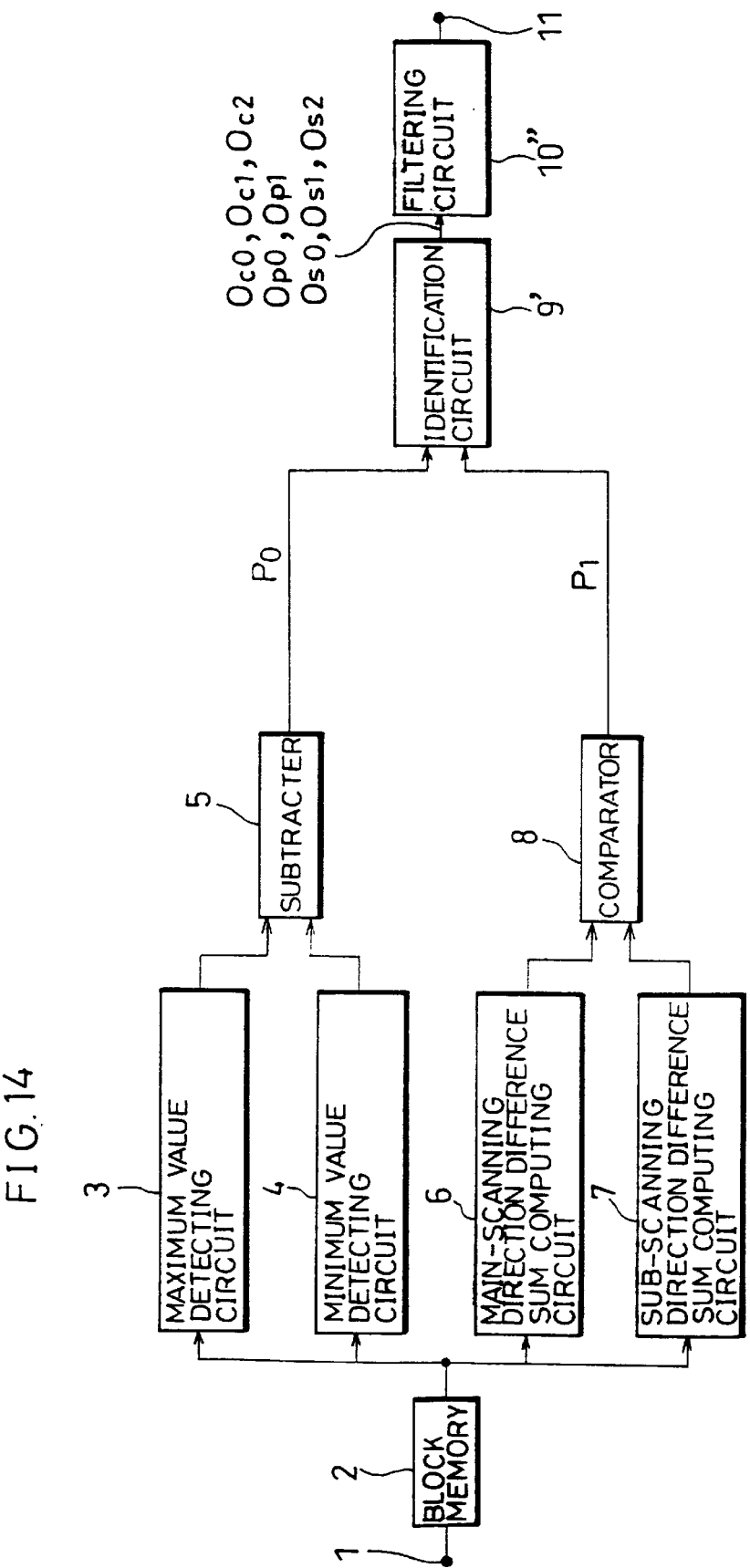
FIG. 14 which shows still another embodiment of the present invention is a block diagram illustrating a schematic configuration of the image processing apparatus.
Figure 15:
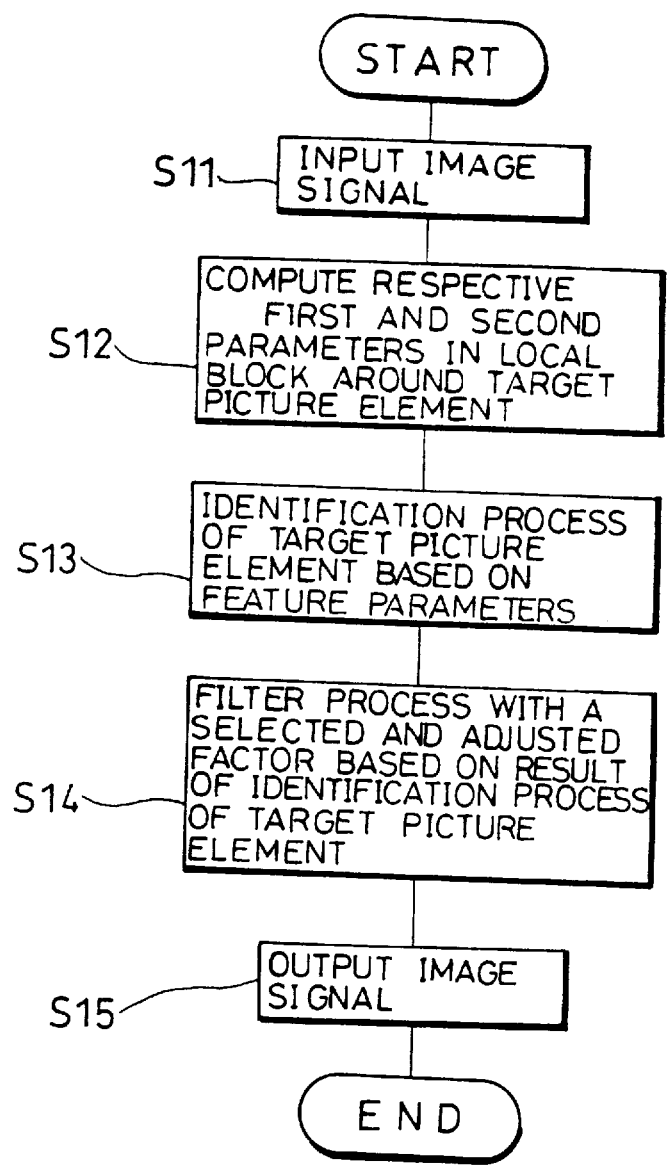
FIG. 15 is a flowchart showing an image processing process of the image processing apparatus of FIG. 14.

The following descriptions will discuss still another embodiment of the present invention in reference to FIGS. 14 and 15. For convenience in explanations, members having the same functions as the aforementioned embodiments will be designated by the same reference numerals, and thus the description thereof shall be omitted here.

In each of the aforementioned embodiments, explanations have been given through the case where the enhancement or smoothing process is applied to the target picture element respectively using the enhancement filter or the smoothing filter having a predetermined filter factor. In contrast, the explanations will be given through the case where the filtering process is applied to the target picture element by setting an optimum filter factor for each picture element.

The image processing apparatus of the present embodiment adopts a filtering circuit 10" (filtering means) illustrated in FIG. 14 in replace of the filtering circuit 10' illustrated in FIG. 9 of the image processing apparatus in accordance with the third embodiment. Other than the above, the image processing apparatus of the present embodiment has the same arrangement as the third embodiment.

The spatial-filtering process of the image processing apparatus in accordance with the present embodiment is shown in the flowchart of FIG. 15. When an image signal obtained by scanning the document is inputted to the image processing apparatus (S11), an image signal in the local block including the target picture element at the center is stored in the block memory 2 of FIG. 14. Then, the respective first and second feature parameters $P_0$ and $P_1$ in the local block are computed by the maximum value detecting circuit 3, the minimum value detecting circuit 4, the subtracter 5, the main-scanning direction difference sum computing circuit 6, the sub-scanning direction difference sum computing circuit 7 and the comparator 8 (S12). Next, the identification circuit 9 performs the identification process of representing the respective likelihoods that the target picture element is located in the character region, the photographic region and the dot region in the form of numeral (S13). Based on the result of this identification process with respect to the target picture element, the filtering circuit 10" performs a spatial-filtering process by selecting and adjusting the filter factor (S14). Then, the filtering circuit 10" outputs an image signal from the output terminal 11 (S15). The image processing apparatus performs sequentially the described process with respect to all the picture elements.

The filtering circuit 10" computes a filter factor and performs the spatial-filtering process in the following manner based on the outputs from the identification circuit 9' respectively representing the likelihood that the target picture element is located in the character region, the photographic region and the dot region.

Assumed here that the numerals representing the likelihood that the target picture element is located in the character region and the likelihood that the target picture element is located in the dot region outputted from the identification circuit 9' are respectively designated by $O_c$ and $O_s$, and these outputs are regulated to "0" or "1".

Then, the weighted factor $W_e$ of the enhancement filter and the weighted factor $W_s$ of the smoothing filter are given through the following formulae (4) and (5).

$$W_e = g_1(O_c) \tag{4}$$

$$W_s = g_2(O_s) \tag{5}$$

For example, $W_e$ and $W_s$ are given by the following formula (6) in this example.

$$g_1(x) = g_2(x) = \begin{cases} -10x + 11 & (x \geq 0.2) \\ 0 & (x < 0.2) \end{cases} \tag{6}$$

By the spatial filter f1 having the input of $W_e$ and $W_s$, the spatial-filtering process is performed with respect to the input image signal I as shown by the following formula (7), and the processed value O is outputted.

$$O = f_1(W_e, W_s, I) \tag{7}$$

The filter represented by the following formula (8) shown as one example of the spatial filter $f_1$.

$$O = \begin{cases} \left( \dfrac{1}{W_e} \begin{bmatrix} 0 & -1 & 0 \\ - & W_e+4 & -1 \\ 0 & -1 & 0 \end{bmatrix} \right) \cdot I \\ \left\{ \left( \dfrac{1}{W_s+8} \begin{bmatrix} 1 & 1 & 1 \\ 1 & W_s & 1 \\ 1 & 1 & 1 \end{bmatrix} \right) \cdot I \right\} & (W_e \geq 2, W_s \geq 2) \\ \left( \dfrac{1}{W_s+8} \begin{bmatrix} 1 & 1 & 1 \\ 1 & W_s & 1 \\ 1 & 1 & 1 \end{bmatrix} \right) \cdot I & (W_e < 2, W_s \geq 2) \\ \left( \dfrac{1}{W_e} \begin{bmatrix} 0 & -1 & 0 \\ -1 & W_e+4 & -1 \\ 0 & -1 & 0 \end{bmatrix} \right) \cdot I & (W_e \geq 2, W_s < 2) \\ I & (W_e < 2, W_s < 2) \end{cases} \quad (8)$$

In the formula (8), "[ ]·I" represents a convolution calculation between an operator "[]" and an image signal I.

In the case of applying the filtering process considering the picture elements surrounding the target picture element, the following technique may be adopted.

Assumed here that the weighted factor of the enhancement filter for the previously processed picture element and the weighted factor of the smoothing filter for the previously processed picture element are Wen and $W_{sn}$. Then, by the spatial filter $f_2$ having the inputs of $W_e$, $W_s$, $W_{en}$ and $W_{sn}$, the spatial-filtering process is performed with respect to the input image signal I as shown by the formula (9), and the processed value O is outputted.

$$O = f_2(W_e, W_s, W_{en}, W_{sn}, I) \quad (9)$$

Here, as one example of the spatial filter $f_2$, a filter of the formula (8) wherein the weighted mean of $W_e$ and $W_{en}$ and the weighted mean of the $W_s$ and $W_{sn}$ are respectively designated by new $W_e$ and $W_s$ is shown.

For the functions $g_1$ and $g_2$ for computing $W_e$ and $W_s$, other functions than (6) may be adopted. For the spatial filters $f_1$, and $f_2$, randomly selected mask size or a filter factor other than those shown in (8) may be used.

As described, the image processing apparatus of the present embodiment having the sixth feature of the third embodiment is arranged such that the filtering circuit 10" for performing the spatial-filtering process by computing the filter factor based on the data representing the likelihood that the target picture element is located in each region outputted from the identification circuit 9' by the numeral is adopted in replace of the filtering circuit 10' of (8). This arrangement is referred to as a seventh feature.

By adjusting the filter factor by the data representing the likelihood that the target picture element is located in each region in the form of numeral, a delicate spatial-filtering process according to the feature of each picture element is enabled in addition to the effect achieved by the arrangement of the sixth feature.

The image processing apparatus in accordance with the third or the fourth embodiment having the arrangement of the sixth or the seventh feature, for the identification circuit 9' of (7), not the neural network itself but the two-dimensional look up table based on the input-output characteristics of the neural network is employed in the identification processing means for outputting the respective likelihoods of the character region, the photographic region and the dot region where the target picture element in the local block is located in the form of numeral. This arrangement is referred to as the eighth feature.

As described, by reflecting the input/output characteristics of the neural network learned beforehand, the identification process can be performed with high precision at real time, thereby enabling a prompt image process.

The image processing apparatus in accordance with the third embodiment or the fourth embodiment having the arrangement of the sixth, seventh or eighth feature, a weighted mean accumulating circuit 20 for computing a weighted mean between the second feature parameter $P_1$ (smaller one of a sum of the differences in signal level between every two picture elements which are in sequence in the main-scanning direction in a local block, and a sum of the differences in signal level between every two picture elements which are in sequence in the sub-scanning direction in the local block) and a weighted mean of the previous block and for outputting the resulting value as a new second feature parameter to the identification circuit 9' is provided. This arrangement is referred to as a ninth feature. As described, by considering not only the information in the currently processed local block, but also the information in the surrounding local blocks are considered, an image identification of an improved precision can be achieved.

In the image processing apparatus in accordance with the third or fourth embodiment having the arrangement of the first, the seventh or the eighth feature, the filtering circuit 10' or 10" includes: memory means (not shown) for storing contents (description) of the spatial-filtering process applied to the picture elements surrounding the target picture element, wherein based on both the data representing the likelihood of each region from the identification circuit 9' and the information stored in the memory means, a predetermined spatial-filtering process is selected and applied to the target picture element. This arrangement is referred to as a tenth feature.

Since each of the character region, the photographic region and the dot region has a certain area, by considering the filtering processes applied to to the picture elements surrounding the target picture element, even if an error occurs in identifying the region where the target picture element is located by the identification circuit 9', an adverse effect from the identification error can be suppressed to a certain degree, thereby suppressing a change in texture on the boundaries which divide the image into regions.

[EMBODIMENT 5]

The following descriptions will discuss still another embodiment of the present invention in reference to FIGS. 16 through 25. For convenience in explanations, members having the same functions as the aforementioned embodiments will be designated by the same reference numerals, and thus the descriptions thereof shall be omitted here.

In the aforementioned embodiments, explanations have been given through the case of adopting the two-dimensional process using two feature parameters of the first feature parameter Po and the second feature parameter $P_1$ in the identification process of the target picture element. In contract, a multi-dimensional identification process including an increased number of feature parameters is adopted in the present embodiment to attain an improved precision of the image identification.

Specifically, in addition to the first feature parameter $P_0$ (difference between the maximum signal level and the minimum signal level in the local block composed of the target picture element and plural picture elements surrounding the target picture element) and the second feature parameter $P_1$ (a smaller one of a sum of the differences in signal level between every two picture elements which are in sequence in the main-scanning direction in a local block, and a sum of the differences in signal level between two adjacent picture elements which are in sequence in the sub-scanning direction in the local block), the following defined third feature parameter $P_2$ and fourth feature parameter $P_3$ are also considered. Namely, four feature parameters are used in total in the present embodiment.

The third feature parameter $P_2$ is determined in the following manner: The signal level in the local block composed of the target picture element and the plural picture elements surrounding the target picture element are converted to one of two numerals by an average signal level of the local block, and the respective change points in the main-scanning direction and the sub-scanning direction based on the resulting data expressed using two numerals are counted ($0 \rightarrow 1$, $1 \rightarrow 0$), and a smaller count value is determined as the third feature parameter $P_2$.

The fourth feature parameter $P_3$ is determined in the following manner: The signal level in the local block composed of the target picture element and the plural picture elements surrounding the target picture element are converted to one of two numerals by the average signal level in the local block, and the respective lengths of the array of the picture elements having the same density, i.e., the run-lengths in the main-scanning direction and the sub-scanning direction with respect to the resulting data expressed using two numerals are counted, and the maximum value of all the run-lengths is determined as the fourth feature parameter $P_3$.

Figure 16:
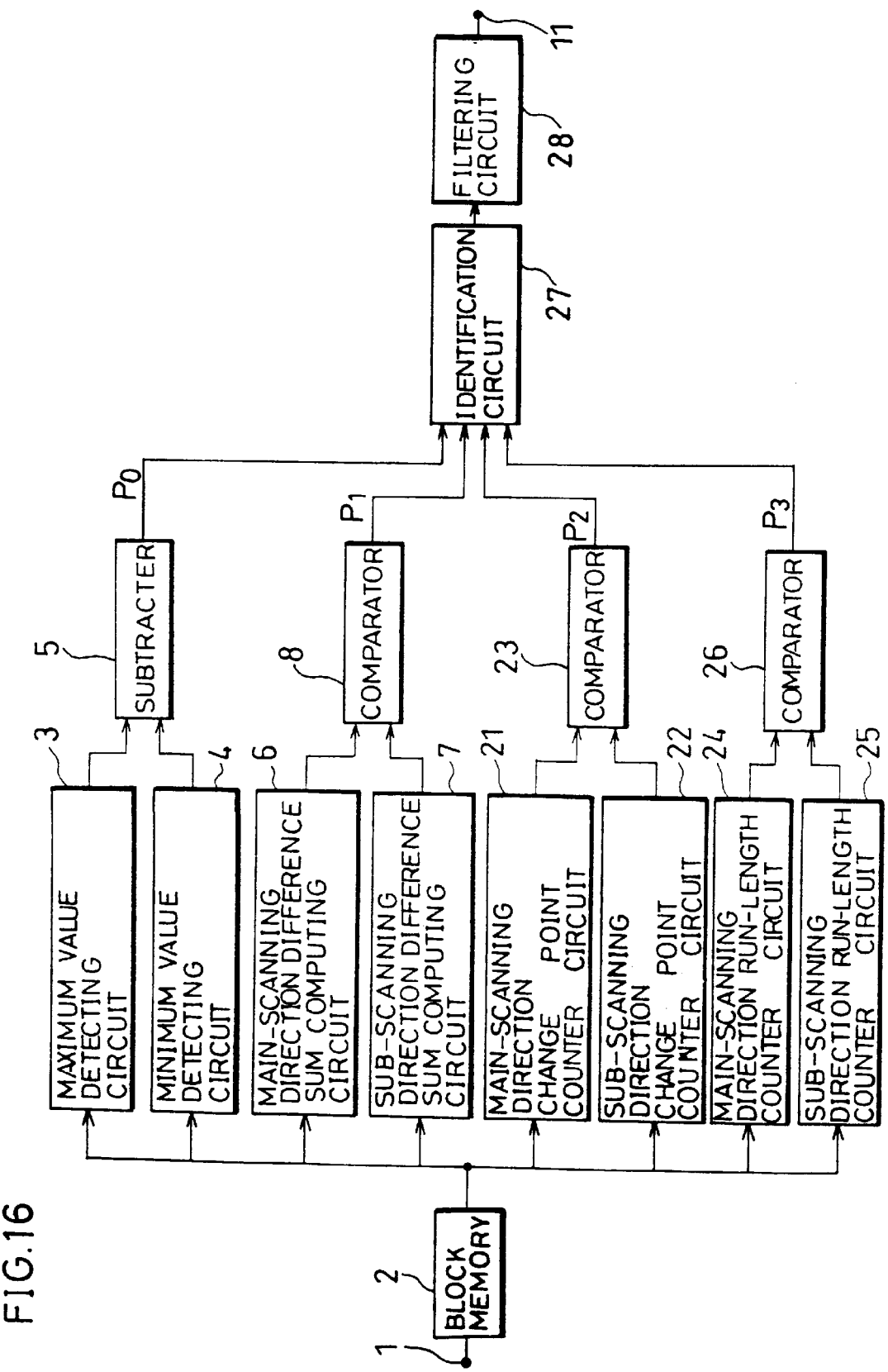
FIG. 16 which shows still another embodiment of the present invention is a block diagram illustrating a schematic configuration of the image processing apparatus.

As shown in FIG. 16, the image processing apparatus in accordance with the present embodiment includes: an input terminal 1, a block memory 2, a maximum value detecting circuit 3, a minimum value detecting circuit 4, a subtracter 5, a main-scanning direction difference sum computing circuit 6, a sub-scanning direction difference sum computing circuit 7, a comparator 8, a main-scanning direction change point counter circuit 21, a sub-scanning direction change point counter circuit 22, a comparator 23, a main-scanning direction run-length counter circuit 24, a sub-scanning direction run-length counter circuit 25, a comparator 26, an identification circuit 27, a filtering circuit 28 and an output terminal 11.

The main-scanning direction change point counter circuit 21, the sub-scanning direction change point counter circuit 22 and the comparator 23 serve as feature parameter computing means for computing the third feature parameter $P_2$. The main-scanning direction change point counter circuit 21 converts the signal levels of the local block in one of the two numerals by an average signal level, and counts the number of change points between the adjacent picture elements in the main-scanning direction with respect to the resulting binary data. The sub-scanning direction change point counter circuit 22 converts the signal level in the local block to one of two numerals by the average signal level in the local block, and counts the number of change points in the adjacent picture elements in the sub-scanning direction. Then, the comparator 23 compares the number of change points in the main-scanning direction and the number of changes in the sub-scanning direction, and the smaller value (minimum value) between them is computed as a feature parameter (third feature parameter) of the third feature parameters $P_2$.

The main-scanning direction run-length counter circuit 24, the sub-scanning direction run-length counter circuit 25 and the comparator 26 serve as feature parameter computing means for computing the fourth feature parameter $P_3$. The main-scanning direction run-length counter circuit 24 converts the signal levels of the target picture element and the picture elements surrounding the target picture element in each local block to one of two numerals by the average signal level in the local block, and respective lengths of the array of the picture elements having the same density (binary level), i.e., the run-lengths are counted with respect to the resulting binary data, and determines the maximum value in the resulting run-lengths is computed. The sub-scanning direction run-length counter circuit 25 converts the signal level of each local block to one of two numerals by the average signal level in the local block, and counts the respective lengths of the array of the picture elements having the same density (binary level), i.e., the run-lengths with respect to the resulting data expressed using two numerals, thereby computing the maximum of all the run-lengths. The comparator 26 compares the maximum run-length in the main-scanning direction with the maximum run-length in the sub-scanning direction, and the greater value (maximum value) is computed as the feature parameter of the fourth feature parameter $P_3$ (fourth feature parameter).

The identification circuit 27 outputs an identification signal of 2-bit for identifying that the target picture element in the local block is located in which one of the character region, the photographic region and the dot region, or a numeric signal of 8-bit representing the likelihood of each region based on the inputs of the first through fourth parameters $P_0$, $P_1$, $P_2$ or $P_3$.

Based on the outputs from the identification circuit 27, the filtering circuit 28 performs an optimal spatial-filtering process with respect to an input image signal, and in the case where the output from the identification circuit 27 is an identification signal of 2-bit which identifies each region, the filtering circuit 10 of the first embodiment is adopted, while in the case where the output from the identification circuit 27 is a signal of 8-bit representing the likelihood of each region, the filtering circuit 10' of the third embodiment, or the filtering circuit 10" of the fourth embodiment is adopted.

Figure 17:
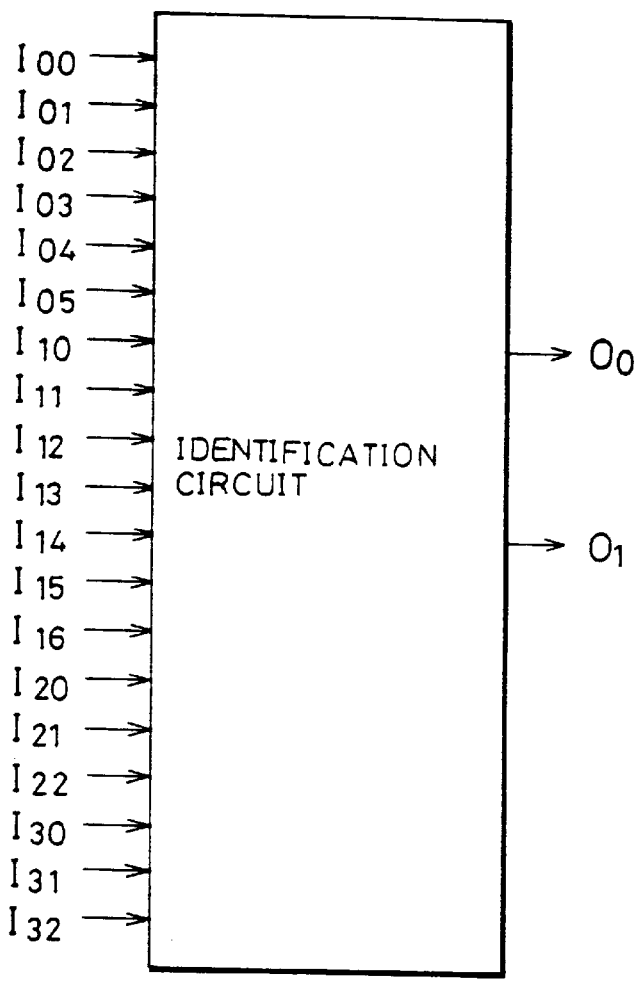
FIG. 17 is a view schematically illustrating a structure of one example of the identification circuit of FIG. 16.

The example of the configuration of the identification circuit 27 is shown in FIG. 17. The identification circuit 27 shown in the figure is arranged such that when the first through fourth parameters $P_0$, $P_1$, $P_2$ and $P_3$ are inputted thereto, it outputs the identification signals $O_0$ and $O1$ of 2-bit identifying the region where the target picture element in the local block is located, i.e, the character region, the photographic region or the dot region. Here, explanations will be given through the case where the local block with a size of 5 picture elements×5 picture elements is adopted. In the identification circuit 27, the input of the first feature parameter $P_0$ is a signal of 6-bit, more precisely 6 bits ($I_{00}$ through $I_{05}$ in the figure) from the top out of 8 bits are used. The input of the second feature parameter $P_1$ is a signal of 7-bit, more specifically 7 bits ($I_{10}$ through $I_{16}$ in the figure) from the top out of 10 bits are used. The input of the third feature parameter $P_2$ is 3-bit signal (in the figure $I_{20}$ through $I_{22}$) are used. The input value of the fourth feature parameter $P_3$ is 3 bits (in the figure $I_{30}$ through $I_{32}$) are used.

Figure 18:
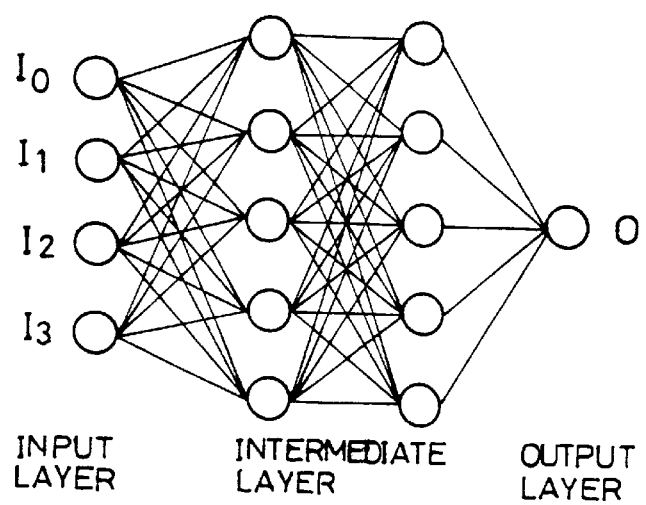
FIG. 18 is a view schematically illustrating a structure of a neural network as the identification circuit of FIG. 17.

For the identification circuit 27, a multi-dimensional look up table having a predetermined input/output characteristics by the neural networks or the neural network itself is used. In this embodiment, as an example of the neural network, as shown in FIG. 18, a four-layer perceptron is used, and in the input layer, a normalized first feature parameter $P_0$ is inputted to $I_0$, a normalized second parameter $P_1$ is inputted to $I_1$, a normalized third feature parameter $P_2$ is inputted to $I_2$, and a normalized fourth feature parameter $P_3$ is inputted to $I_3$.

On the other hand, an identification value O for selecting a spatial-filtering process is outputted to the output layer.

Figure 19:
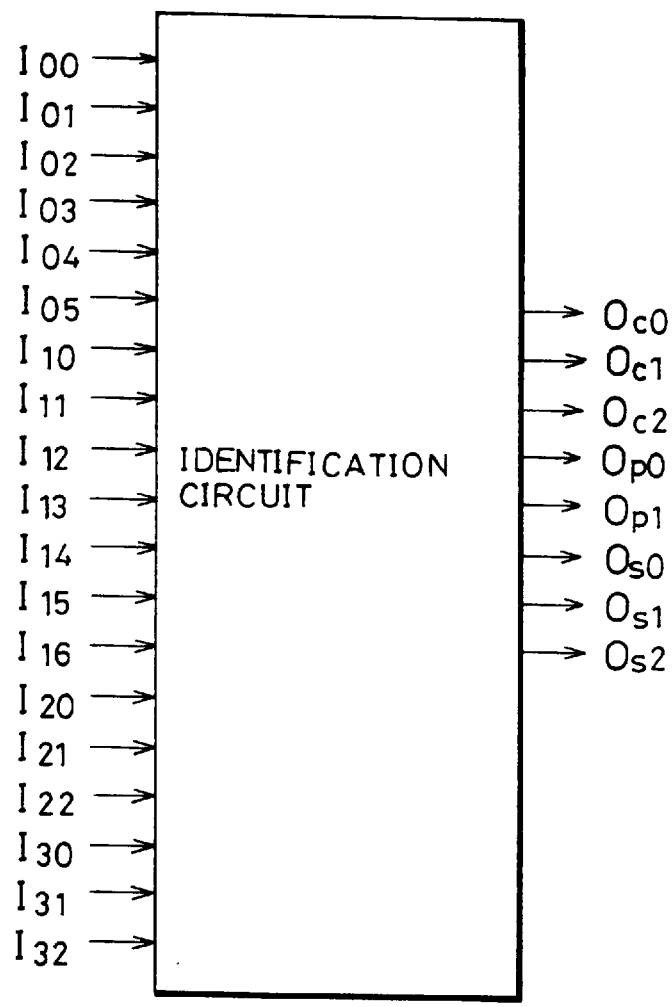
FIG. 19 is a view schematically illustrating a structure of a neural network as the identification circuit of FIG. 16.

Another structure of the identification circuit 27 is shown in FIG. 19. The identification circuit 27 shown in the figure outputs signals $O_{c0}$ through $O_{c2} \cdot O_{p0} \cdot O_{p1} \cdot O_{s0}$ through $O_{S2}$ that is a signal of 8-bits representing a likelihood of each of the character region, the photographic region and the dot region that the target picture element in the local block is located upon inputting thereto the first through fourth feature parameters $P_0$, $P_1$, $P_2$, and $P_3$. Here, explanations will be given through the case where the local block with a size of 5 picture elements×5 picture elements is adopted. In the identification circuit 27, the input of the first feature parameter $P_0$ is a 6-bit signal, more specifically 6 bits ($I_{00}$ through $I_{05}$ in the figure) from the top out of 8 bits are used. The input of the second feature parameter $P_1$ is a signal of 7-bit, more precisely 7 bits ($I_{10}$ through $I_1$ in the figure) from the top among 10 bits is used. The input of the third feature parameter $P_2$ is a a signal of 3 bit, and in the figure, $I_{20}$ through $I_{22}$ are used. The input of the fourth feature parameter $P_3$ is a signal of 3-bit, and $I_{30}$ through $I_{32}$ are used in the figure.

Figure 20:
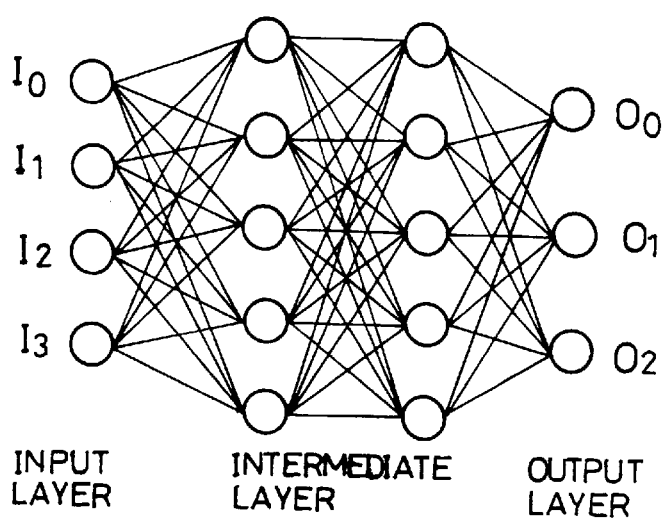
FIG. 20 is a view schematically illustrating a structure of a neural network as the identification circuit of FIG. 19.

For the identification circuit 27, a multi-dimensional look up table having a predetermined input/output characteristics by the neural network or the neural network itself is used. In the present embodiment, as an example of the neural network, as shown in FIG. 20, a four layer perceptron is used, and in the input layer, a normalized first feature parameter $P_0$ is inputted to $I_0$, a normalized second parameter $P_1$ is inputted to $I_1$, a normalized third feature parameter $P_2$ is inputted to $I_2$, and a normalized fourth feature parameter $P_3$ is inputted to $I_3$. A numeral representing the likelihood of the character portion, a numeral representing the likelihood of each region is outputted to the output layer as $O_c$, $O_p$ and $O_s$.

Based on the output from the identification circuit 27, the filtering circuit 28 performs one of the spatial-filtering process shown in the first, second or fourth embodiments, thereby outputting an image signal.

Figure 21:
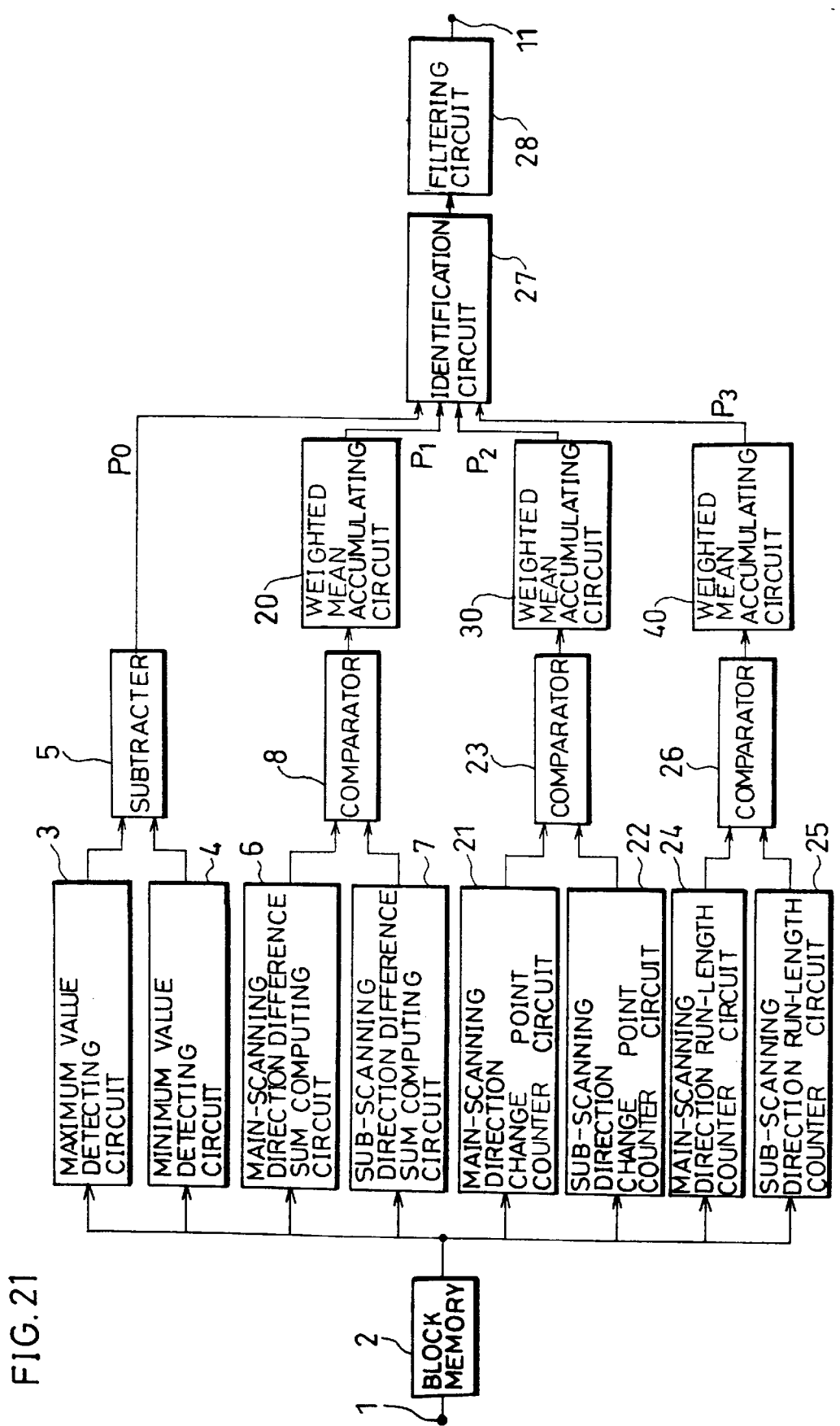
FIG. 21 which shows still another embodiment of the present invention is a block diagram illustrating a schematic configuration of the image processing apparatus.

Alternatively, it may be also arranged so as to provide the weighted mean accumulating circuits 20, 30 and 40 at the respective secondary stages of the comparators 8, 23 and 26 as shown in FIG. 21. The respective weighted mean of the second through fourth feature parameters $P_1$ through $P_3$ computed by the comparators and the second through fourth feature parameters $P_1$ through $P_3$ in the previous local block are inputted to the identification circuit 27 as new second through fourth feature parameters $P_1$ through $P_3$.

As described, by considering not only the currently processed local block but also the weighted average of the feature parameters obtained in all the local blocks in the main-scanning direction and the sub-scanning direction, an improved preciseness of the identification can be achieved. Namely, since each of the character region, the photographic region and the dot region has a certain area, by considering not only the information regarding the current block but also the information regarding the local blocks surrounding the target block, the identification can be performed with an improved precision.

In the described preferred embodiment, the multi-dimensional identification process using the four feature parameters (first through fourth parameters $P_0$, $P_1$, $P_2$ and $P_3$) is adopted to achieve the image identification with high precision. However, the number of the feature parameters is not limited to this. For example, the structure adopting the feature parameters of two or more selected among the described four parameters may be adopted, and a structure of adopting other feature parameters than the described four parameters may be adopted. Additionally, the number of feature parameters for performing the multi-dimensional identification process is not limited as long as it is not less than two, and needless to mention, feature parameters of five or more may be used.

Figure 22:
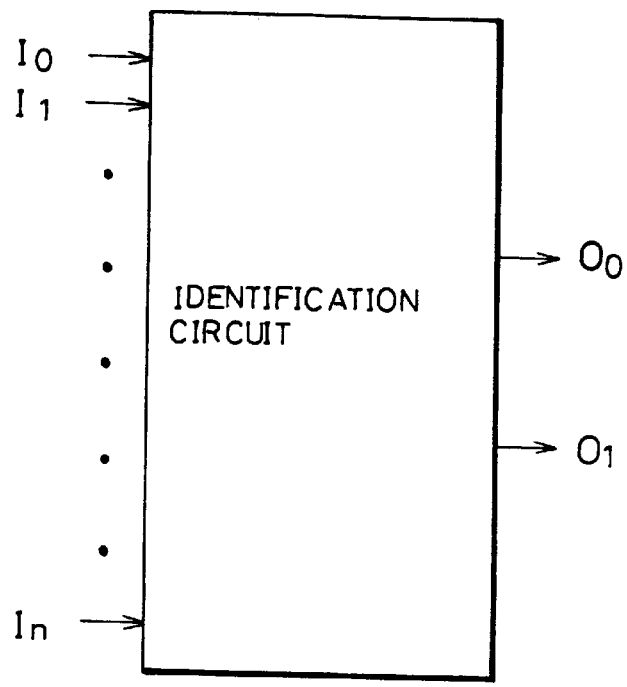
FIG. 22 is a view illustrating a schematic structure of one example of the identification circuit in the case where the identification process of the target picture element is expanded to an n-dimensional space ($n \leq 2$).
Figure 23:
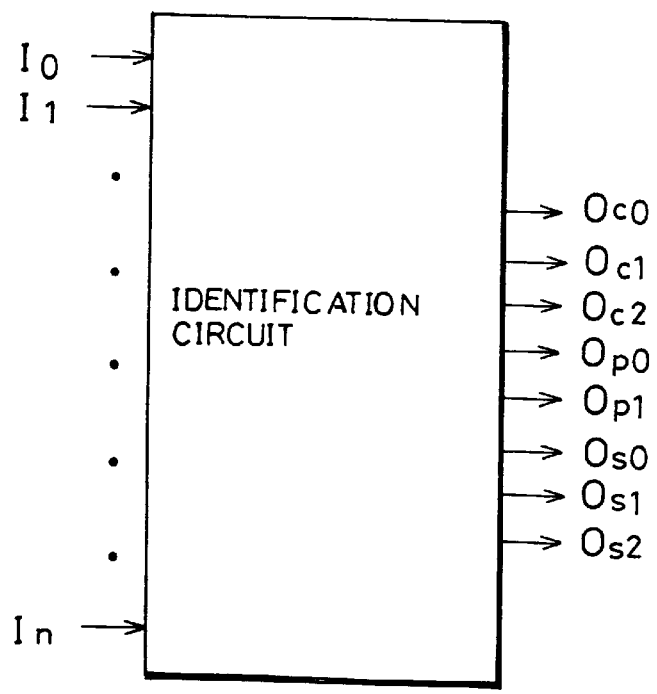
FIG. 23 is a view illustrating a schematic structure of another example of the identification circuit in the case where the identification process of the target picture element is expanded to an n-dimensional space ($n \leq 2$).
Figure 24:
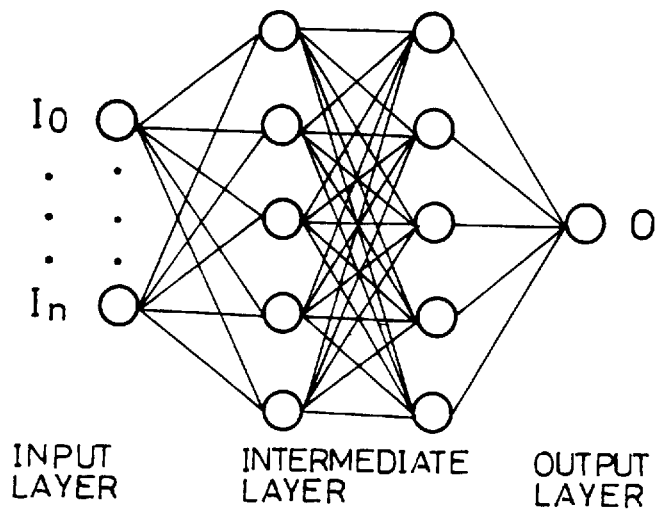
FIG. 24 is a view illustrating a schematic structure of the neural network as the identification circuit of FIG. 22.
Figure 25:
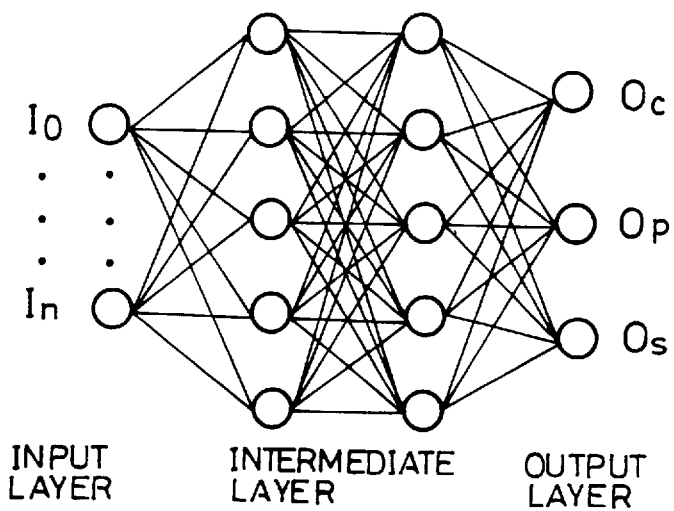
FIG. 25 is a view illustrating a schematic structure of the neural network of the identification circuit of FIG. 23.

FIGS. 22 through 25 show an example of the identification circuit in the case where the identification process of the target picture element is expanded n-dimensionally ($n \leq 2$). FIG. 22 shows the structure where upon inputting the feature parameters $P_0$, $P_1$, ... $P_n$ to $I_0$, $I_1$, ... $I_n$ in the figure, the identification signals $O_0$, $O_1$ of two-bit for identifying the area where the target picture element in the local block is located, i.e., the character region, the photographic region, and the dot region is outputted. FIG. 23 shows the structure where upon inputting the feature parameters $P_0$, $P_1$ ... $P_n$ to $I_0$, $I_1$, ... $I_n$ in the figure, numeral signals $O_{c0}$ through $O_{c2}$, $O_{p0}$, $O_{p1}$, $O_{s0}$ through $O_{s2}$ of 8-bit representing the respective likelihood that the target picture element in the local block is located in each region (the character region, the photographic region and the dot region) is outputted. An example of the neural network which constitutes the identification circuit of FIG. 22 and the example of the neural network which constitutes the identification circuit of FIG. 23 are respectively shown in FIG. 24 and FIG. 25.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus, comprising:

a block memory for storing image data in a local block composed of a target picture element and plural picture elements surrounding the target picture element, the target picture element being one picture element data of an image signal;

feature parameter computing means for computing respective plural feature parameters from the image data in the local block stored in said block memory;

identification processing means for outputting region identification information representing respective likelihoods that the target picture element is located in a character region, a photographic region and a dot region, said identification processing means dividing a plane or a multi-dimensional space having axes of the plural feature parameters into the character region, the photographic region and the dot region by non-linear boundaries and outputting respective region identification information according to each input of the plural feature parameters; and filtering means for selecting a filter among spatial-filtering-use filters of various types based on an output from said identification processing means and applying a spatial-filtering process to the target picture-element;

wherein said filtering means includes comparison means for making a comparison among said respective likelihoods represented by said region identification information outputted from said identification processing means, and when said comparison means determines a region which shows a highest likelihood, said filtering means selects a filter for a spatial-filtering process which is suited for the region, while when said comparison means determines that there is no significant difference in the likelihoods, said filtering means performs a spatial-filtering process for outputting the target picture element without processing it.

2. The image processing apparatus as set forth in claim 1, wherein:

said identification processing means is composed of a neural network which learned well beforehand, said neural network receiving each input of the plural feature parameters and outputting the region identification information.

3. The image processing apparatus as set forth in claim 1, wherein:

said identification processing means is composed of a look up table describing an input-output correlation of a neural network which learned well beforehand, said neural network receiving an input of the plural feature parameters and outputting said region identification information.

4. The image processing apparatus as set forth in claim 1, further comprising:

memory means for storing a description of a spatial-filtering process applied to a picture element prior to the target picture element; and said filtering means includes correction means for correcting the region identification information from said identification processing means according to the description of the spatial-filtering process stored in said memory means, that is applied to the picture element directly before processing the target picture element.

5. The image processing apparatus as set forth in claim 1, wherein:

said region identification information from said identification processing means is an identification signal for identifying that the target picture element in the local block is located in which one of the character region, the photographic region and the dot region, and each filter has a filter factor which is predetermined according to each spatial-filtering process.

6. The image processing apparatus as set forth in claim 1, wherein said feature parameter computing means includes:

main-scanning direction feature parameter computing means for computing a feature parameter in the main-scanning direction in the local block;

sub-scanning direction feature parameter computing means for computing a feature parameter in the sub-scanning direction in the local block;

block feature parameter computing means for computing a block feature parameter of the local block based on respective feature parameters computed by said main-scanning direction feature parameter computing means and said sub-scanning direction feature parameter computing means; and weighted mean accumulating section for computing a weighted mean of said block feature parameter and the feature parameter of a lastly processed local block, and the weighted mean computed by said weighted mean accumulating section is outputted to said identification processing means as one of the plural feature parameters of the local block to be currently processed.

7. The image processing apparatus as set forth in claim 1, further comprising:

memory means for storing description of spatial-filtering processes applied to the plural picture elements surrounding the target picture element, wherein said filtering means determines a description of a spatial-filtering process to be applied to the target picture element based on not only the region identification information from said identification processing means but also the description of the spatial-filtering processes applied to the plural picture elements surrounding the target picture element.

8. The image processing apparatus as set forth in claim 7, wherein:

said memory means includes an application number memory section for storing an accumulated number of times each spatial-filtering process is applied to a predetermined number of picture elements prior to processing the target picture element.

9. The image processing apparatus as set forth in claim 1, wherein:

said feature parameter computing means includes a signal level difference computing means for outputting a difference between a maximum signal level and a minimum signal level in the local block to said identification processing means as one of the plural feature parameters.

10. The image processing apparatus as set forth in claim 1, wherein said feature parameter computing means includes:

main-scanning direction difference sum computing means for computing a sum of differences in signal level between picture elements in a local block which are in sequence in the main-scanning direction;

sub-scanning direction difference sum computing means for computing a sum of differences in signal level between picture elements in the local block which are in sequence in the sub-scanning direction; and minimum value computing means for outputting a minimum value of computation results by said main-scanning direction difference sum computing means and the sub-scanning direction difference sum computing means to said identification processing means as one of the plural feature parameters.

11. The image processing apparatus as set forth in claim 1, wherein said feature parameter computing means includes:

binary means for converting signal levels of the target picture element and the plural picture elements surrounding the target picture element in the local block to one of two numerals;

main-scanning direction change point counter means for counting a number of changes in signal level between two values in the main-scanning direction;

sub-scanning direction change point counter means for counting a number of changes in signal level between two values in the sub-scanning direction; and minimum value computing means for outputting a minimum value of count results by said main-scanning direction change point counter means and said sub-scanning direction change point counter means as one of the plural feature parameters.

12. The image processing apparatus as set forth in claim 1, wherein said feature parameter computing means includes:

binary means for converting signal levels of the target picture element and the plural picture elements surrounding the target picture element in local block to one of two numerals;

main-scanning direction run-length counter means for computing a run-length in the main-scanning direction of a signal level converted to one of the two numerals;

sub-scanning direction run-length counter means for computing a run-length in the sub-scanning direction of a signal level converted to one of the two numerals; and maximum value computing means for outputting a maximum value of count results by said main-scanning direction run-length counter means and said sub-scanning direction run-length counter means as one of the plural feature parameters.

13. The image processing apparatus as set forth in claim 6, wherein:

said weighted mean accumulating section computes a weighted mean $P_1$ from formula (1)

$$P_1=(\alpha P_1 a+\beta P_1 b)/(\alpha+\beta)(\alpha>\beta) \quad (1)$$

wherein $P_1 a$ is a block feature parameter computed by said block feature parameter computing means, and $P_1 b$ is the feature parameter in the previously processed local block.

14. The image processing apparatus as set forth in claim 6, wherein:

said main-scanning direction feature parameter computing means is composed of main-scanning direction difference sum computing means for computing a sum of differences in signal level between two picture elements in the local block which are in sequence in a main-scanning direction;

said sub-scanning direction feature parameter computing means is composed of sub-scanning direction difference sum computing means for computing a sum of differences in signal level between two picture elements in the local block which are in sequence in a sub-scanning direction; and said block feature parameter computing means is composed of minimum value computing means for computing a minimum value of computation results by said main-scanning direction difference sum computing means said sub-scanning direction difference sum computing means and outputting the minimum value to said weighted mean accumulating section as the block feature parameter.

15. The image processing apparatus as set forth in claim 6, wherein:

said feature parameter computing means further includes binary means for converting signal levels of the target picture element and the plural picture elements in the local block to one of two numerals, said main-scanning direction feature parameter computing means is composed of a main-scanning direction change point counter means for counting a number of changes in signal level between two values in the main-scanning direction, said sub-scanning direction feature parameter computing means is composed of a sub-scanning direction change point counter means for counting a number of changes in signal level between two values in the sub-scanning direction; and said block feature parameter computing means is composed of minimum value computing means for computing a minimum value resulting from respective computations by said main-scanning direction change point counter means and said sub-scanning direction change point counter means.

16. The image processing apparatus as set forth in claim 6, wherein:

said feature parameter computing means further includes binary means for converting signal levels in the target picture element and the plural picture elements in the local block to one of two numerals, said main-scanning direction feature parameter computing means is composed of main-scanning direction run-length counter means for counting a run-length in the main-scanning direction of signal levels of the target picture element and the plural picture elements surrounding the target picture element converted to one of the two numerals, said sub-scanning direction feature parameter computing means is composed of sub-scanning direction run-length counter means for counting a run-length in the sub-scanning direction of signal levels of the target picture element and the plural picture elements surrounding the target picture element converted to one of the two numerals, and said block feature parameter computing means is composed of maximum value computing means for computing a maximum value of computation results by said main-scanning direction run-length counter means and said sub-scanning direction run-length counter means and outputting the maximum value to said weighted mean accumulating section as the block feature parameter.

17. The image processing apparatus as set forth in claim 4, wherein:

said correction is applied by adding to the output value representing a likelihood of each region, a value representing a likelihood of a region according to the content of a spacial-filtering process lastly applied to a picture element, stored in said memory means.

18. An image processing apparatus, comprising:

a block memory for storing image data in a local block composed of a target picture element and plural picture elements surrounding the target picture element, the target picture element being one picture element data of an image signal;

feature parameter computing means for computing respective plural feature parameters from the image data in the local block stored in said block memory;

identification processing means for outputting region identification information representing respective likelihoods that the target picture element is located in a character region, a photographic region and a dot region, said identification processing means dividing a plane or a multi-dimensional space having axes of the plural feature parameters into the character region, the photographic region and the dot region by non-linear boundaries and outputting respective region identification information according to each input of the plural feature parameters; and filtering means for selecting a filter among spatial-filtering-use filters of various types based on an output from said identification processing means and applying a spatial-filtering process to the target picture-element; and wherein said filtering means including comparison means for making a comparison among said respective likelihoods represented by said region identification information outputted from said identification processing means, and when said comparison means determines a region which shows a highest likelihood, a spatial-filtering-use filter for the region is selected, while when said comparison means determines that there is no significant difference in said likelihoods, a spatial-filtering process in combination of various spatial-filtering processes is performed.

19. An image processing apparatus, comprising:

a block memory for storing image data in a local block composed of a target picture element and plural picture elements surrounding the target picture element, the target picture element being one image data of an image signal;

feature parameter computing means for computing plural feature parameters based on the image data in the local block stored in said block memory;

identification processing means for outputting region identification information representing respective likelihoods that the target picture element is located in a character region, a photographic region and a dot region; and filtering means for applying a spatial-filtering process to the target picture element using a filter;

wherein filtering means includes filter factor computing means for computing a filter factor suited for the target picture element based on the region identification information from said identification means, said filter factor computing means setting the filter factor in the filter, said filter factor computing means outputs the region identification information in a form of numeral representing each likelihood, and said filter factor computing means computes a filter factor for use in various spatial-filtering processes as a function of the region identification information.

20. The image processing apparatus as set forth in claim 19, wherein:

said identification processing means divides a plane or a multi-dimensional space having axes of the plural feature parameters into the character region, the photographic region and the dot region by non-linear boundaries, said identification processing means being composed of a neural network which learned well beforehand for outputting each likelihood by receiving each input of the plural feature parameters.

21. The image processing apparatus as set forth in claim 19, wherein:

said identification processing means divides a plane or a multi-dimensional space having axes of the plural feature parameters into the character region, the photographic region and the dot region by non-linear boundaries, said identification processing means being composed of a look up table describing an input-output correlation of a neural network which learned well beforehand, said numeral network outputting each likelihood by receiving each input of the plural feature parameters.

22. The image processing apparatus as set forth in claim 19, wherein:

said feature parameter computing means includes a signal level difference computing means for outputting a difference between a maximum signal level and a minimum signal level in the local block to said identification processing means as one of the plural feature parameters.

23. The image processing apparatus as set forth in claim 19, wherein said feature parameter computing means includes:

main-scanning direction difference sum computing means for computing a sum of differences in signal level between picture elements in a local block which are in sequence in the main-scanning direction;

sub-scanning direction difference sum computing means for computing a sum of differences in signal level between picture elements in the local block which are in sequence in the sub-scanning direction; and minimum value computing means for outputting a minimum value of computation results by said main-scanning direction difference sum computing means and the sub-scanning direction difference sum computing means to said identification processing means as one of the plural feature parameters.

24. The image processing apparatus as set forth in claim 19, wherein said feature parameter computing means includes:

binary means for converting signal levels of the target picture element and the plural picture elements surrounding the target picture element in the local block to one of two numerals;

main-scanning direction change point counter means for counting a number of changes in signal level between two values in the main-scanning direction;

sub-scanning direction change point counter means for counting a number of changes in signal level between two values in the sub-scanning direction; and minimum value computing means for outputting a minimum value of count results by said main-scanning direction change point counter means and said sub-scanning direction change point counter means as one of the plural feature parameters.

25. The image processing apparatus as set forth in claim 19, wherein said feature parameter computing means includes:

binary means for converting signal levels of the target picture element and the plural picture elements surrounding the target picture element in local block to one of two numerals;

main-scanning direction run-length counter means for computing a run-length in the main-scanning direction of a signal level converted to one of the two numerals;

sub-scanning direction run-length counter means for computing a run-length in the sub-scanning direction of a signal level converted to one of the two numerals; and maximum value computing means for outputting a maximum value of count results by said main-scanning direction run-length counter means and said sub-scanning direction run-length counter means as one of the plural feature parameters.

26. The image processing apparatus as set forth in claim 19, wherein said feature parameter computing means includes:

main-scanning direction feature parameter computing means for computing a feature parameter in the main-scanning direction in the local block;

sub-scanning direction feature parameter computing means for computing a feature parameter in the sub-scanning direction in the local block;

block feature parameter computing means for computing a block feature parameter of the local block based on feature parameters computed respectively by said main-scanning direction feature parameter computing means and said sub-scanning direction feature parameter computing means; and a weighted mean accumulating section for computing a weighted average of said block feature parameter and a feature parameter of a previously processed local block, and the weighted mean computed by said weighted mean accumulating section is outputted to said identification processing means as one of the plural feature parameters of the local block to be currently processed.

27. The image processing apparatus as set forth in claim 26, wherein:

said weighted mean accumulating section computes a weighted mean $P_1$ from formula (1)

$$P_1 = (\alpha P_1 a + \beta P_1 b)/(\alpha+\beta)(\alpha>\beta) \qquad (1)$$

wherein $P_1 a$ is a block feature parameter computed by said block feature parameter computing means, and $P_1 b$ is the feature parameter in the previously processed local block.

28. The image processing apparatus as set forth in claim 26, wherein:

said main-scanning direction feature parameter computing means is composed of main-scanning direction difference sum computing means for computing a sum of differences in signal level between two picture elements in the local block which are in sequence in a main-scanning direction;

said sub-scanning direction feature parameter computing means is composed of sub-scanning direction difference sum computing means for computing a sum of differences in signal level between two picture elements in the local block which are in sequence in a sub-scanning direction; and said block feature parameter computing means is composed of minimum value computing means for computing a minimum value of computation results by said main-scanning direction difference sum computing means said sub-scanning direction difference sum computing means and outputting the minimum value to said weighted mean accumulating section as the block feature parameter.

29. The image processing apparatus as set forth in claim 26, wherein:

said feature parameter computing means further includes binary means for converting signal levels of the target picture element and the plural picture elements in the local block to one of two numerals, said main-scanning direction feature parameter computing means is composed of a main-scanning direction change point counter means for counting a number of changes in signal level between two values in the main-scanning direction, said sub-scanning direction feature parameter computing means is composed of a sub-scanning direction change point counter means for counting a number of changes in signal level between two values in the sub-scanning direction; and said block feature parameter computing means is composed of minimum value computing means for computing a minimum value resulting from respective computations by said main-scanning direction change point counter means and said sub-scanning direction change point counter means.

30. The image processing apparatus as set forth in claim 26, wherein:

said feature parameter computing means further includes binary means for converting signal levels in the target picture element and the plural picture elements in the local block to one of two numerals, said main-scanning direction feature parameter computing means is composed of main-scanning direction run-length counter means for counting a run-length in the main-scanning direction of signal levels of the target picture element and the plural picture elements surrounding the target picture element converted to one of the two numerals, said sub-scanning direction feature parameter computing means is composed of sub-scanning direction run-length counter means for counting a run-length in the sub-scanning direction of signal levels of the target picture element and the plural picture elements surrounding the target picture element converted to one of the two numerals, and said block feature parameter computing means is composed of maximum value computing means for computing a maximum value of computation results by said main-scanning direction run-length counter means and said sub-scanning direction run-length counter means and outputting the maximum value to said weighted mean accumulating section as the block feature parameter.

31. An image processing apparatus comprising:

a block memory for storing image data in a local block composed of a target picture element and plural picture elements surrounding the target picture element, the target picture element being one image data of an image signal;

feature parameter computing means for computing plural feature parameters based on the image data in the local block stored in said block memory;

identification processing means for outputting region identification information representing respective likelihoods that the target picture element is located in a character region, a photographic region and a dot region;

filtering means for applying a spatial-filtering process to the target picture element using a filter, said filtering means including filter factor computing means for computing a filter factor suited for the target picture element based on the region identification information from said identification means, said filter factor computing means setting the filter factor in the filter; and filter factor memory means for storing therein a filter factor used in processing a picture element directly before processing the target picture element, wherein said identification processing means outputs the region identification information in a form of numeral representing each likelihood, and said filter factor computing means outputs a filter factor for use in each spatial-filtering process as a function between the region identification information indicating the region in which the target picture element is located and the filter factors stored in said filter factor memory means.

32. The image processing apparatus as set forth in claim 31, wherein:

said filter factor is computed based on a weighted mean of a filter factor computed as a function of region identification information regarding the region of the picture element and the filter factor stored in said filter factor storing means.

33. The image processing apparatus as set forth in claim 31, wherein:

said identification processing means divides a plane or a multi-dimensional space having axes of the plural feature parameters into the character region the photographic region and the dot region by non-linear boundaries, said identification processing means being composed of a neural network which learned well beforehand for outputting each likelihood by receiving each input of the plural feature parameters.

34. The image processing apparatus as set forth in claim 31, wherein:

said identification processing means divides a plane or a multi-dimensional space having axes of the plural feature parameters into the character region, the photographic region and the dot region by non-linear boundaries, said identification processing means being composed of a look up table describing an input-output correlation of a neural network which learned well beforehand, said numeral network outputting each likelihood by receiving each input of the plural feature parameters.

35. The image processing apparatus as set forth in claim 31, wherein:

said feature parameter computing means includes a signal level difference computing means for outputting a difference between a maximum signal level and a minimum signal level in the local block to said identification processing means as one of the plural feature parameters.

36. The image processing apparatus as set forth in claim 31, wherein said feature parameter computing means includes:

main-scanning direction difference sum computing means for computing a sum of differences in signal level between picture elements in a local block which are in sequence in the main-scanning direction;

sub-scanning direction difference sum computing means for computing a sum of differences in signal level between picture elements in the local block which are in sequence in the sub-scanning direction; and minimum value computing means for outputting a minimum value of computation results by said main-scanning direction difference sum computing means and the sub-scanning direction difference sum computing means to said identification processing means as one of the plural feature parameters.

37. The image processing apparatus as set forth in claim 31, wherein said feature parameter computing means includes:

binary means for converting signal levels of the target picture element and the plural picture elements surrounding the target picture element in the local block to one of two numerals;

main-scanning direction change point counter means for counting a number of changes in signal level between two values in the main-scanning direction;

sub-scanning direction change point counter means for counting a number of changes in signal level between two values in the sub-scanning direction; and minimum value computing means for outputting a minimum value of count results by said main-scanning direction change point counter means and said sub-scanning direction change point counter means as one of the plural feature parameters.

38. The image processing apparatus as set forth in claim 31, wherein said feature parameter computing means includes:

binary means for converting signal levels of the target picture element and the plural picture elements surrounding the target picture element in local block to one of two numerals;

main-scanning direction run-length counter means for computing a run-length in the main-scanning direction of a signal level converted to one of the two numerals;

sub-scanning direction run-length counter means for computing a run-length in the sub-scanning direction of a signal level converted to one of the two numerals; and maximum value computing means for outputting a maximum value of count results by said main-scanning direction run-length counter means and said sub-scanning direction run-length counter means as one of the plural feature parameters.

39. The image processing apparatus as set forth in claim 31, wherein said feature parameter computing means includes:

main-scanning direction feature parameter computing means for computing a feature parameter in the main-scanning direction in the local block;

sub-scanning direction feature parameter computing means for computing a feature parameter in the sub-scanning direction in the local block;

block feature parameter computing means for computing a block feature parameter of the local block based on feature parameters computed respectively by said main-scanning direction feature parameter computing means and said sub-scanning direction feature parameter computing means; and a weighted mean accumulating section for computing a weighted average of said block feature parameter and a feature parameter of a previously processed local block, and the weighted mean computed by said weighted mean accumulating section is outputted to said identification processing means as one of the plural feature parameters of the local block to be currently processed.

40. The image processing apparatus as set forth in claim 39, wherein:

said weighted mean accumulating section computes a weighted mean $P_1$ from formula (1)

$$P_1=(\alpha P_1 a+P_1 b)/(\alpha+\beta)(\alpha>\beta) \qquad (1)$$

wherein $P_1 a$ is a block feature parameter computed by said block feature parameter computing means, and $P_1 b$ is the feature parameter in the previously processed local block.

41. The image processing apparatus as set forth in claim 39, wherein:

said main-scanning direction feature parameter computing means is composed of main-scanning direction difference sum computing means for computing a sum of differences in signal level between two picture elements in the local block which are in sequence in a main-scanning direction;

said sub-scanning direction feature parameter computing means is composed of sub-scanning direction difference sum computing means for computing a sum of differences in signal level between two picture elements in the local block which are in sequence in a sub-scanning direction; and said block feature parameter computing means is composed of minimum value computing means for computing a minimum value of computation results by said main-scanning direction difference sum computing means said sub-scanning direction difference sum computing means and outputting the minimum value to said weighted mean accumulating section as the block feature parameter.

42. The image processing apparatus as set forth in claim 39, wherein:

said feature parameter computing means further includes binary means for converting signal levels of the target picture element and the plural picture elements in the local block to one of two numerals, said main-scanning direction feature parameter computing means is composed of a main-scanning direction change point counter means for counting a number of changes in signal level between two values in the main-scanning direction, said sub-scanning direction feature parameter computing means is composed of a sub-scanning direction change point counter means for counting a number of changes in signal level between two values in the sub-scanning direction; and said block feature parameter computing means is composed of minimum value computing means for computing a minimum value resulting from respective computations by said main-scanning direction change point counter means and said sub-scanning direction change point counter means.

43. The image processing apparatus as set forth in claim 39, wherein:

said feature parameter computing means further includes binary means for converting signal levels in the target picture element and the plural picture elements in the local block to one of two numerals, said main-scanning direction feature parameter computing means is composed of main-scanning direction run-length counter means for counting a run-length in the main-scanning direction of signal levels of the target picture element and the plural picture elements surrounding the target picture element converted to one of the two numerals, said sub-scanning direction feature parameter computing means is composed of sub-scanning direction run-length counter means for counting a run-length in the sub-scanning direction of signal levels of the target picture element and the plural picture elements surrounding the target picture element converted to one of the two numerals, and said block feature parameter computing means is composed of maximum value computing means for computing a maximum value of computation results by said main-scanning direction run-length counter means and said sub-scanning direction run-length counter means and outputting the maximum value to said weighted mean accumulating section as the block feature parameter.

* * * * *